(12) United States Patent
Minami

(10) Patent No.: US 7,812,091 B2
(45) Date of Patent: Oct. 12, 2010

(54) ELECTROPHORETIC PARTICLES AND PRODUCTION PROCESS THEREOF

(75) Inventor: Masato Minami, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/692,755

(22) Filed: Jan. 25, 2010

(65) Prior Publication Data

US 2010/0118385 A1    May 13, 2010

Related U.S. Application Data

(62) Division of application No. 11/138,552, filed on May 27, 2005, now Pat. No. 7,678,862.

(30) Foreign Application Priority Data

| May 31, 2004 | (JP) | ............................ 2004/161697 |
| Jun. 9, 2004 | (JP) | ............................ 2004/171349 |

(51) Int. Cl.
| C08G 73/10 | (2006.01) |
| C08F 2/44 | (2006.01) |
| C08F 4/28 | (2006.01) |
| C08F 2/00 | (2006.01) |
| C08K 9/00 | (2006.01) |

(52) U.S. Cl. ....................... 524/847; 524/849; 526/227; 526/205; 526/236; 523/200; 523/215

(58) Field of Classification Search ................. 524/847, 524/849; 526/227, 205, 236; 523/200, 215
See application file for complete search history.

(56) References Cited

U.S. PATENT DOCUMENTS

| 5,298,833 | A | 3/1994 | Hou ............................ 313/483 |
| 6,194,480 | B1 | 2/2001 | Takeda et al. ................. 522/75 |
| 6,337,358 | B1 * | 1/2002 | Whitehouse et al. ......... 523/200 |
| 6,741,386 | B2 | 5/2004 | Minami ..................... 359/296 |
| 2005/0227155 | A1 | 10/2005 | Minami ....................... 430/37 |
| 2005/0267235 | A1 | 12/2005 | Minami ..................... 523/201 |
| 2005/0267263 | A1 | 12/2005 | Minami ..................... 525/242 |
| 2008/0136772 | A1 | 6/2008 | Minami ..................... 345/107 |

FOREIGN PATENT DOCUMENTS

| JP | 09-508216 | 8/1997 |
| JP | 2003-212913 | 7/2003 |

* cited by examiner

*Primary Examiner*—William K Cheung
(74) *Attorney, Agent, or Firm*—Fitzpatrick, Cella, Harper & Scinto

(57) ABSTRACT

Electrophoretic particles are constituted by pigment particles provided with a polymer chain connected with a polymerization initiation group at a surface of pigment particle. The resultant electrophoretic particles are excellent particle size uniformity and dispersibility.

2 Claims, 5 Drawing Sheets

(a)

(b)

(a)

(b)

ELECTROPHORETIC PARTICLES AND PRODUCTION PROCESS THEREOF

CROSS-REFERENCE TO RELATED APPLICATIONS

This application is a divisional application of U.S. application Ser. No. 11/138,552 filed May 27, 2005, which claims priority of Japanese Patent Application Nos. 2004-161697, filed May 31, 2004 and 2004-171349, filed Jun. 9, 2004. The contents of all of the aforementioned applications are hereby incorporated by reference herein in their entireties.

FIELD OF THE INVENTION AND RELATED ART

The present invention relates to electrophotographic particles comprising pigment particles and a process for producing the electrophoretic particles.

In recent years, with development of information equipment, the needs for low-power and thin display devices have grown, so that extensive study and development have been made on display devices fitted to these needs.

As one of the display devices, there is an electrophoretic display device.

In the electrophoretic display device, a multiplicity of electrophoretic particles which are positively charged and colored are dispersed in a space between a pair of substrates, each provided with an electrode, together with an electrophoretic dispersion liquid which is filled in the space and colored a color different from the color of the electrophoretic particles. In the space, a partition wall is formed so that it divides the space into a multiplicity of pixels along a planar direction of the substrates. By forming such a partition wall, it is possible to define the space between the pair of substrates while preventing localization of the electrophoretic particles.

In such an electrophoretic display device, when a positive-polarity voltage is applied to an observer's side electrode and a negative-polarity voltage is applied to an electrode on an opposite side, the positively charged electrophoretic particles are collected so as to cover the opposite side electrode, so that a color identical to the color of the electrophoretic dispersion medium is displayed when the electrophoretic display device is observed from the observers side.

On the other hand, when a negative-polarity voltage is applied to the observer's side electrode and a positive-polarity voltage is applied to the opposite side electrode, the positively charged electrophoretic particles are collected so as to cover the observer's side electrode, so that a color identical to the color of the electrophoretic particles is displayed when the electrophoretic display device is observed from the observer's side.

By performing such a drive of the electrophoretic display device on a pixel-by-pixel basis, any image or character is displayed by a multiplicity of pixels.

With respect to a production process of the particles, several proposals have been mode (Japanese Laid-Open Patent Application (JP-A) Tokkai 2003-212913, JP-A Tokuhyo Hei 9-508216, and U.S. Pat. No. 6,194,488).

However, as the electrophoretic particles for use in the electrophoretic display device, further improvements in uniformity of particle size and dispersibility have been required.

SUMMARY OF THE INVENTION

An object of the present invention is to provide a process, for producing electrophoretic particles, having solved the above described problems.

A specific object of the present invention is to provide electrophoretic particles excellent in uniformity of particle size and dispersibility.

Another object of the present invention is to provide a process for producing the electrophoretic particles and an electrophoretic display device using the electrophoretic particles.

(1) First Invention

According to a first aspect of the present invention, there is provided electrophoretic particles comprising pigment particles, wherein at a surface of pigment particle, a polymer chain is connected with a nitroxide-mediated polymerization initiation group.

According to a first aspect of the present invention, there is provided a process for producing electrophoretic particles comprising pigment particles, comprising:

a step of introducing a nitroxide-mediated polymerization initiation group to a surface of pigment particle by reacting pigment particles having a function group, which is capable of reacting with a precursor of the nitroxide-mediated polymerization initiation group, with the precursor of the nitroxide-mediated polymerization initiation group, and a step of grafting a polymer chain to the nitroxide-mediated polymerization initiation group by nitroxide-mediated polymerization.

In a preferred embodiment, the precursor of the nitroxide-mediated polymerization initiation group is triethoxysilyl group, trimethoxysilyl group or trichlorosilyl group.

Further, the function group which is capable of reacting with the precursor of the nitroxide-mediated polymerization initiation group may preferably be hydroxyl group.

(2) Second Invention

According to a second aspect of the present invention, there is provided an electrophoretic particles comprising pigment particles, wherein at a surface pigment particle, a polymer chain is connected with a living radical polymerization initiation group and the polymer has an affinity for a hydrocarbon solvent.

According to the second aspect of the present invention, there is also provided a process for producing electrophoretic particles comprising pigment particles, comprising:

a step of forming a living radical polymerization initiation group at a surface of pigment particle, and a step of providing the pigment particles with a polymer chain connected with the living radical polymerization initiation group by living radical polymerization, wherein the polymer has an affinity for a hydrocarbon solvent.

According to the second aspect of the present invention, there is further provided a process for producing electrophoretic particles comprising pigment particles, comprising:

a step of forming a nitroxide-mediated polymerization initiation group at a surface of pigment particle by reacting pigment particles each having hydroxyl group at a surface thereof with a precursor of the nitroxide-mediated polymerization initiation group, and a step of polymerizing a monomer having an affinity for a hydrocarbon solvent by nitroxide-mediated polymerization and providing the pigment particles with the resultant polymer connected with the nitroxide-mediated polymerization initiation group.

According to the second aspect of the present invention, there is still further provided a process for producing electrophoretic particles comprising pigment particles, comprising:

a step of forming a atom transfer radical polymerization initiation group at a surface of pigment particle by reacting pigment particles each having hydroxyl group at a surface thereof with a precursor of the atom transfer radical polymerization initiation group, and a step of polymerizing a monomer having an affinity for a hydrocarbon solvent by atom transfer radical polymerization and providing the pigment particles with the resultant polymer connected with the atom transfer radical polymerization initiation group.

The above described electrophoretic particles according to the first to third aspects of the present invention are excellent in particle size uniformity and dispersibility.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

(1) Embodiments According to First Invention

Figure 1:
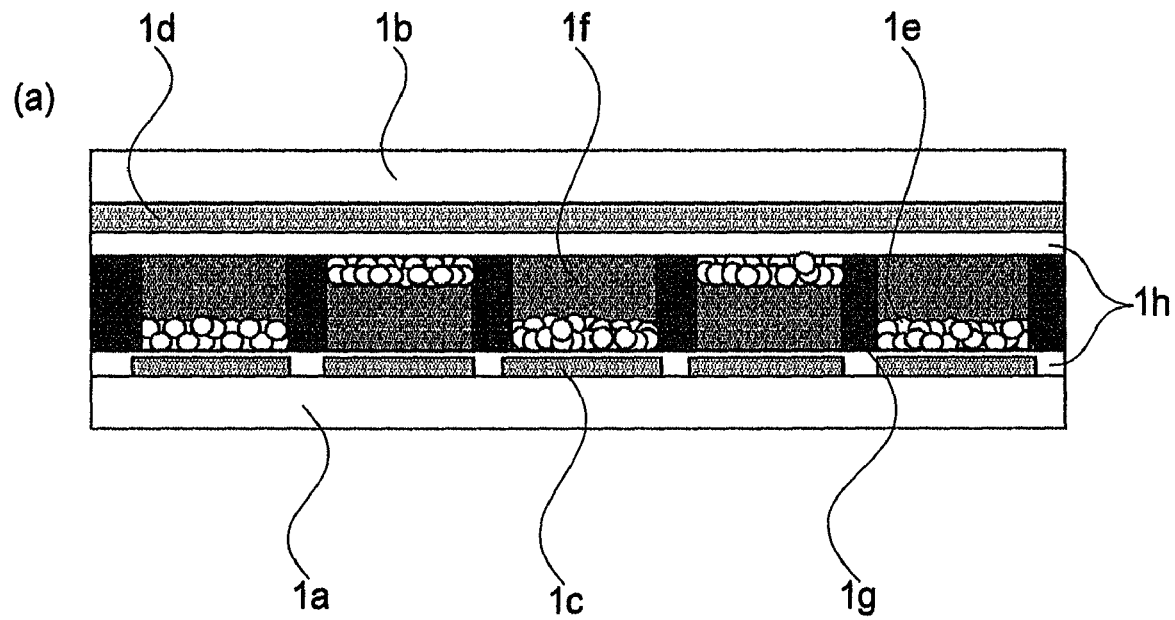
FIGS. 1(a) and 1(b) are schematic sectional views showing an embodiment of an electrophoretic display device using electrophoretic particles of the present invention.
Figure 1:
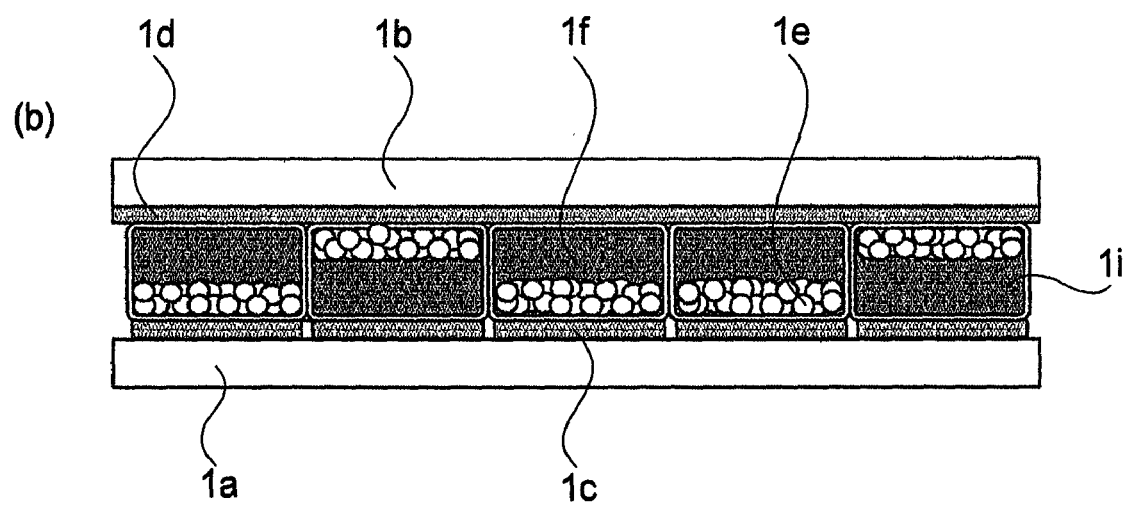

In an embodiment according to the first aspect of the present invention electrophoretic particles are prepared by introducing a nitroxide-mediated polymerization initiation group to a surface of pigment particle and grafting a polymer chain from the nitroxide-mediated polymerization initiation group through nitroxide-mediated polymerization.

(Introduction of Nitroxide-Mediated Polymerization Initiation Group)

Hereinbelow, a step of introducing the nitroxide-mediated polymerization initiation group to the surface of pigment particle will be described.

In accordance with a reaction formula (1-I) shown below, it is possible to introduce the nitroxide-mediated polymerization initiation group to the surface of pigment particle. More specifically, in a reaction solvent, the pigment particles and Precursor 1 (shown below) of the nitroxide-mediated polymerization initiation group are added and reacted with each other to introduce the nitroxide-mediated polymerization initiation group to the surface of pigment particle. Triethoxysilyl group of Precursor 1 may be trimethoxysilyl group or trichlorosilyl group.

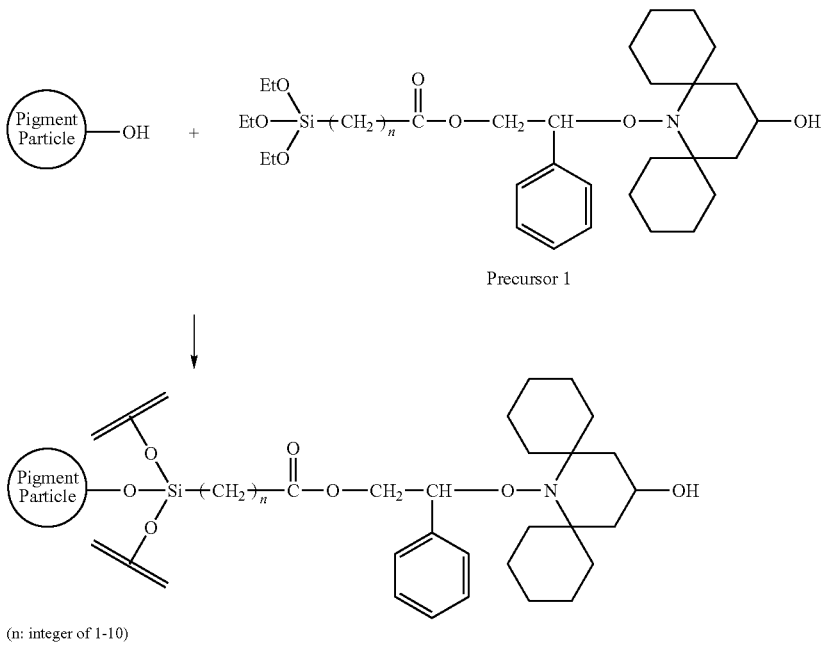

The pigment particles may preferably have a function group, capable of reacting with the precursor of the nitroxide-mediated polymerization initiation group, such as hydroxyl group. When the pigment particles have no function group, the pigment particles may preferably be appropriately surface-treated to introduce the function group to a surface of pigment particles.

The reaction solvent is not particularly limited but it is possible to use dimethylsulfoxide, dimethylformamide, benzene, toluene, xylene, etc.

In the reaction formula (1-I) shown above, Precursor 1 of the nitroxide-mediated polymerization initiation group may be replaced with Precursors 2 to 13 shown below, wherein n is an integer of 1-10 and triethoxysilyl group may be replaced with trimethoxysilyl group or trichlorosilyl group.
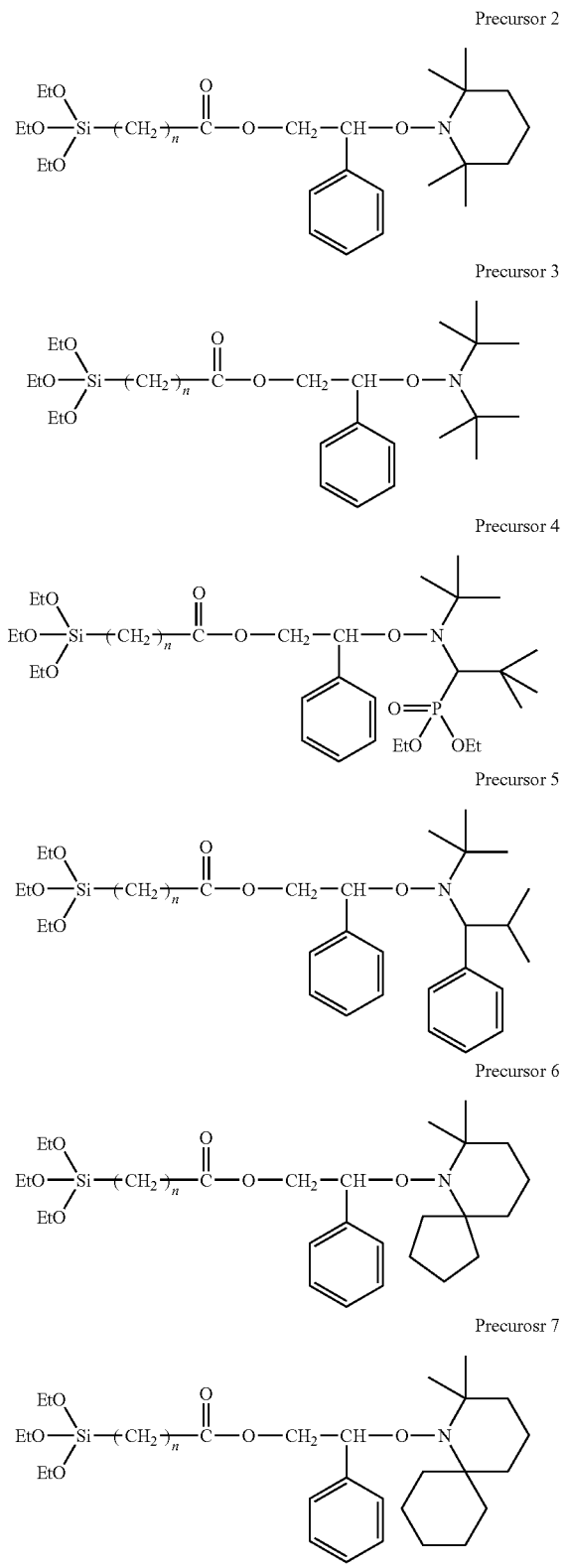
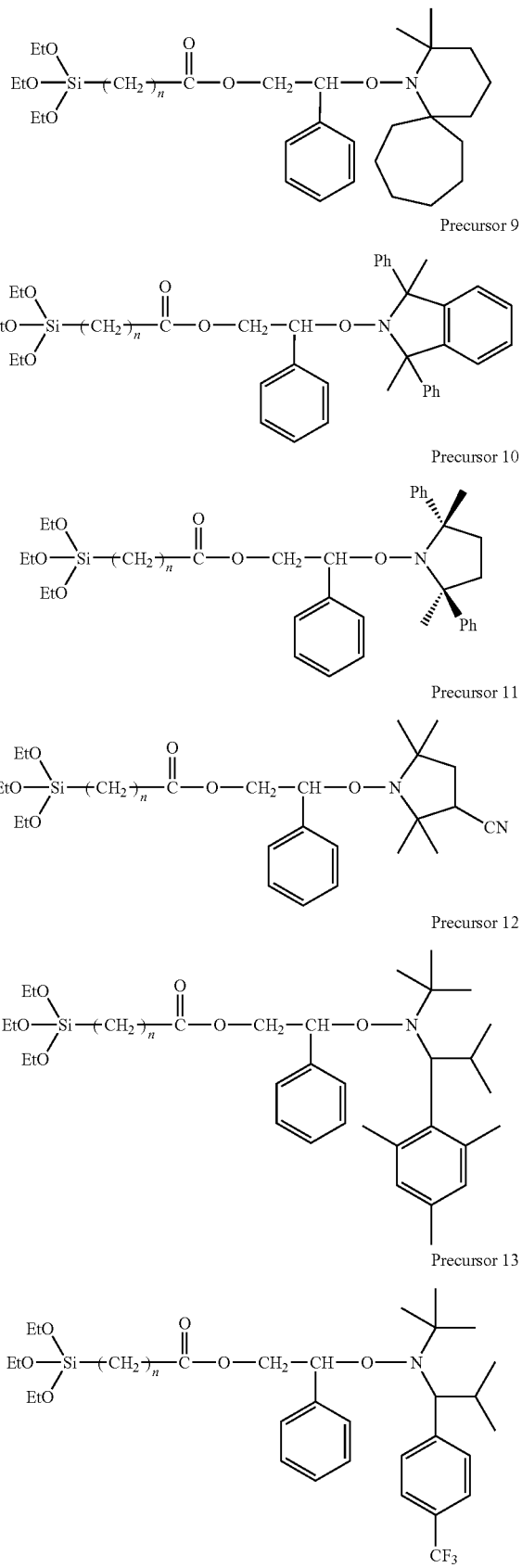

(Nitroxide-Mediated Polymerization)

Next, a step of forming a polymer chain by using, as the core particles, the particles to which the atom nitroxide-mediated polymerization initiation group is introduced through the reaction formula (1-I) will be described.

After the core particles are dispersed in the reaction solvent, a polymerizable monomer for constituting the polymer chain is added and then an atmosphere of the reaction system is replaced with inert gas to effect the atom transfer radical polymerization.

The reaction solvent is not particularly limited so long as the pigment particles are dispersed in the reaction solvent. Examples of the reaction solvent may include dimethyl sulfoxide, dimethylformamide, benzene, toluene, xylene, diephenyl ether, etc. Alternatively, the polymerization may be performed without using the reaction solvent.

As the inert gas, it is possible to use nitrogen or argon.

A polymerization temperature is in the range of 40-150° C., preferably 60-120° C. Below 40° C., the polymer chain formed undesirably has a low molecular weight and the polymerization does not readily proceed.

During the polymerization, it is preferable that a free polymerization initiation group (species) which is not fixed at the particle surface is added. As free polymer obtained from the free polymerization initiation group can be used as an index of a molecular weight and a molecular weight distribution of the polymer chain grafted to the particle.

As the free polymerization initiation group, it is preferable that the same group as the nitroxide-mediated polymerization initiation group fixed at the particle surface is selected. More specifically, with respect to the particles obtained through the reaction formula (1-I), nitroxide similar to Precursor 1 is preferred.

After the reaction, the formed particles are separated and purified by an appropriate method, such as filtration, decantation, precipitation fractionation, centrifugation, or the like, and then are subjected to drying and classification to obtain electrophoretic particles.

The electrophotographic particles may preferably have a concentration of 0.5-50 wt. %, more preferably 1-30 wt. %, per the weight of the electrophoretic dispersion medium.

(Polymerizable Monomer Providing Polymer Chain and Polymer Chain)

It is possible to provide the polymer chain of the above described electrophoretic particles with an electric charge function and a dispersion function.

First, the polymer chain having the dispersion function will be described.

The polymer chain having the dispersion function is characterized in that it is a polymer having a high affinity for the electrophoretic dispersion medium. The high affinity means that the polymer chain and the electrophoretic dispersion medium are excellent in mutual solubility without causing phase separation. The polymer chain has a stearic-exclusion effect of preventing agglomeration between particles by possessing an expanse in the electrophoretic dispersion medium.

As the polymerizable monomer providing the polymer chain having the dispersion function, as described above, the resultant polymer is required to have the high affinity with the electrophoretic dispersion medium. Examples of the polymerizable monomer may include 1-hexene, 1-heptene, 1-octene, 1-decene, butadiene, isoprene, isobutylene, etc. These may be used singly or in combination of two or more species.

Next, the polymer chain having the charge function will be described.

As the polymerizable monomer providing the polymer chain having the charge function, it is possible to use a basic polymerizable monomer, an acidic polymerizable monomer, and a fluorine-containing polymerizable monomer.

Examples of the basic polymerizable monomer may include: methyl(meth-)acrylate, ethyl(meth-)acrylate, propyl (meth-)acrylate, pentyl(meth-)acrylate, hexyl(meth-)acrylate, 2-ethylhexyl(meth-)acrylate, heptyl(meth-)acrylate, octyl(meth)-acrylate, nonyl(meth-)acrylate, decyl(meth-)acrylate, dodecyl(meth-)acrylate, tetradecyl(meth-)acrylate, hexadecyl(meth-)acrylate, octadecyl(meth-)acrylate, aminomethyl(meth-)acrylate, aminoethyl(meth-)acrylate, N,N-dimethylaminomethyl(meth-)acrylate, N,N-dimethylaminoethyl(meth-)acrylate, (meth-)acrylamide, N,N-dimethyl (meth-)acrylamide, N,N-diethyl(meth-)acrylamide, 4-vinylpyridine, etc.

When an acidic additive is added to the polymer chain obtained from the basic polymerizable monomer, an acid-base interaction between these substances are caused to occur, thus imparting positive chargeability to the particles. Further, the polymer chain having the charge function can also have the dispersion function by appropriately selecting the kinds of the basic polymerizable monomer and the acidic additive and by appropriately adjusting an addition amount of the acidic additive, so that it is not necessary to effect grafting of the polymerizable monomer having the dispersion substance to the particle.

As the acidic additive, an acidic substance which is soluble in the electrophoretic dispersion medium is preferred. For example, it is possible to use rosin acid, rosin ester, rosin acid derivative, poly(meth-)acrylic acid, polyisobutylenesuccinic acid anhydride, etc.

An addition amount of the acidic additive may appropriately added depending on the kind thereof but may preferably be 0.001-10 wt. %, preferably 0.01-5 wt. %, with respect to the electrophoretic dispersion medium.

On the other hand, examples of the acidic polymerizable monomer may include: (meth-)acrylic acid, 2-butenoic acid (crotonic acid), 3-butenoic acid (vinylacetic acid), 3-methyl-3-butenoic acid, 3-pentenoic acid, 4-pentenoic acid, 4-methyl-4-pentenoic acid, 4-hexenoic acid, 5-hexenoic acid, 5-methyl-5-hexenoic acid, 5-heptenoic acid, 6-heptenoic acid, 6-methyl-6-heptenoic acid, 6-octenoic acid, 7-octenoic acid, 8-decenoic acid, 9-decenoic acid, 3-phenyl-2-propenoic acid (cinnamic acid), carboxymethyl(meth-)acrylate, carboxyethyl(meth-)acrylate, vinyl benzoic acid, vinylphenyl acetic acid, vinylphenyl propionic acid, maleic acid, fumaric acid, methylenesuccinic acid (itaconic acid), hydroxyl styrene, styrenesulfonic acid, vinyltoluenesulfonic acid, vinylsulfonic acid, sulfomethyl(meth-)acrylate, 2-sulfoethyl (meth-)acrylate, 2-propene-1-sulfonic acid, 2-methyl-2-propene-1-sulfonic acid, etc.

When a basic additive is added to the polymer chain obtained from the acidic polymerizable monomer, an acid-base interaction between these substances are caused to occur, thus imparting negative chargeability to the particles. Further, the polymer chain having the charge function can also have the dispersion function by appropriately selecting the kinds of the acidic polymerizable monomer and the basic additive and by appropriately adjusting an addition amount of the basic additive, so that it is not necessary to effect grafting of the polymerizable monomer having the dispersion substance to the particle.

As the basic additive, a basic substance which is soluble in the electrophoretic dispersion medium is preferred. For example, it is possible to use polyisobutylsucccinimide, polyvinyl pyridine, pyridine, lecthin, polyvinyl acetate, polyethylene oxide polymethyl methacrylate, polydecyl methacrylate, polydodecyl methacrylate, polyoctadecyl methacrylate, polyacrylamide, polyester, polyether, etc.

An addition amount of the basic additive may appropriately added depending on the kind thereof but may preferably be 0.001-10 wt. %, preferably 0.01-5 wt. %, with respect to the electrophoretic dispersion medium.

Further, examples of the fluorine-containing polymerizable monomer may include: (meth-)acrylate, 2,2,2-trifluoroethyl(meth-)acrylate, pentafluoroethyl(meth-)acrylate, heptafluoropropyl(meth-)acrylate, 3,3,3-trifluoropropyl(meth-)acrylate, nonafluorobutyl(meth-)acrylate, 3,3,4,4,4-pentafluorobutyl(meth-)acrylate, undecafluoropentyl(meth-)acrylate, 4,4,5,5,5-pentafluoropentyl(meth-)acrylate, tridecafluorohexyl(meth-)acrylate, pentadecafluoro-heptyl (meth-)acrylate, etc.

The polymer chain obtained from the fluorine-containing polymerizable monomer has fluorine (atom) which has a large electronegativity, so that it is possible to impart negative chargeability to the particle. The polymer chain has such an affinity with the electrophoretic dispersion medium that it is not so high, thus being preferably one obtained through block polymerization between the fluorine-containing polymerizable monomer and the polymerizable monomer having the dispersion function.

The grafted polymer chain is characterized in that it has a molecular weight distribution index (weight-average molecular weight/number-average molecular weight) which is controlled to be not more than 1.8, preferably not more than 1.5, further preferably not more than 1.3. When the molecular weight distribution index of the grafted polymer chain exceeds 1.8, it is difficult to say that the chain length of polymer chain is uniform and the electrophoretic particles are undesirably liable to cause unevenness in dispersibility and chargeability.

The number-average molecular weight may appropriately be determined depending on whether the polymer chain is of the dispersion function-type or the charge function-type. In the case where the polymer chain is of the dispersion function-type, the number-average molecular weight may preferably be in the range of 500-1,000,000, more preferably 1,000-500,000. Below 500, it is difficult for the polymer chain to have the dispersion function. Above 1,000,000, the solubility in the electrophoretic dispersion medium is undesirably lowered.

A graft density of the polymer chain can be controlled by a degree of introduction of the nitroxide-mediated polymerization initiation group. Further, the chain length of the polymer chain can be controlled by the addition amount of the polymerizable monomer, the polymerization time, etc.

(Pigment)

As the pigment particles as the core particles constituting the electrophoretic particles, it is possible to use an organic pigment particles, inorganic pigment particles, etc.

Examples of the organic pigment particles may include particles of: azo pigments, phthalocyanine pigments, quinacridone pigments, isoindolinone pigments isoindolin pigments, dioxazine pigments, perylene pigments, perinone pigments, thioindigo pigments, quinophthalone pigments, anthraquinone pigments, nitro pigments, and nitroso pigments. Specific examples thereof may include: red pigments, such as Quinacridone Red, Lake Red, Brilliant Carmine, Perylene Red, Permanent Red, Toluidine Red and Madder Lake; green pigments, such as Diamond Green Lake, Phthalocyanine Green, and Pigment Green; blue pigments, such as Victoria Blue Lake, Phthalocyanine Blue, and Fast Sky Blue; yellow pigments, such as Hansa Yellow, Fast Yellow, Disazo Yellow, Isoindolinone Yellow, an Quinophthalone Yellow; and black pigments, such as Aniline Block and Diamond Black.

Examples of the inorganic pigment particles may include particles of: white pigments, such as titanium oxide, aluminum oxide, zinc oxide, lead oxide, and zinc sulphide; black pigments, such as carbon black, magnetite, manganese ferrite black, cobalt ferrite black, and titanium black; red pigments, such as cadmium red, red iron oxide, and molybdenum red; green pigments, such as chromium oxide, viridian, titanium cobalt green, cobalt green, and victoria green; blue pigments, such as ultramarine blue, prussian blue, and cobalt blue; and yellow pigments, such as cadmium yellow, titanium yellow, yellow iron oxide, chrome yellow, and antimony yellow.

The pigment may preferably have an average particle size of 10 nm to 2 μm, more preferably 20 nm to 1 μm. Below 10 nm, a handling characteristic is undesirably lowered considerably. Above 2 μm, a degree of pigmentation ((color) definition) of the pigment is desirably lowered.

(Application to Electrophoretic Display Device)

Hereinbelow, an embodiment of an electrophoretic display device using electrophoretic particles of this (First) invention will be described with reference to the drawings.

FIGS. 1($a$) and 1($b$) are schematic sectional views each showing an embodiment of the electrophoretic display device using the electrophotographic particles of the present invention.

As shown in FIG. 1($a$), the electrophoretic display device includes a first substrate $1a$ provided with a first electrode $1c$ a second substrate $1b$ provided with a second electrode $1d$ which are disposed opposite to each other with a predetermined spacing through a partition wall $1g$. In a cell (space) defined by the pair of first and second substrates $1a$ and $1b$ and the partition wall $1g$, an electrophoretic dispersion liquid comprising at least electrophoretic particles $1e$ and an electrophoretic dispersion medium $1f$ is sealed. On each of the electrodes $1c$ and $1d$, an insulating layer $1h$ is formed. A display surface of the electrophoretic display device is located on the second substrate $1b$ side.

FIG. 1($b$) shows an electrophoretic display device using microcapsules. On a first substrate $1a$, a plurality of microcapsules $1i$ each containing the electrophoretic dispersion liquid are disposed and covered with a second substrate $1b$. In the case of using the microcapsules $1i$, the insulating layer $1h$ may be omitted.

In FIGS. 1($a$) and 1($b$), the first electrode $1c$ comprises a plurality of electrode portions as pixel electrodes capable of independently applying a desired electric field to the electrophoretic dispersion liquid in each cell (or each microcapsule), and the second electrode $1d$ is a common electrode through which the same potential is applied to the entire display area.

The first electrode $1c$ (pixel electrode) is provided with an unshown switching element (for each electrode portion) and is supplied with a selection signal from an unshown matrix drive circuit row by row and also supplied with a control signal and an output from an unshown drive transistor column by column. As a result, it is possible to apply a desired electric field to the electrophoretic dispersion liquid (electrophoretic particles $1e$) in each of the cells groups.

The electrophoretic particles $1e$ in each individual cell (or microcapsule) are controlled by an electric field applied through the first electrode $1c$, whereby at each pixel, the color (e.g., white) of the electrophoretic particles $1e$ and the color (e.g., blue) of the dispersion medium $1f$ are selectively displayed. By effecting such a drive on a pixel-by-pixel basis, it is possible to effect display of arbitrary images and characters by use of corresponding pixels.

(Constitution of Electrophoretic Display Device)

The first substrate 1a is formed of any insulating member, for supplying the electrophoretic display device, such a glass, plastic, or the like.

As the first electrode 1c, it is possible to use a (vapor-) deposition film of ITO (indium tin oxide), tin oxide, indium oxide, gold, chromium, or the like. Pattern formation of the first electrode 1c can be performed by photolithography.

The second substrate 1b may be a transparent substrate or a transparent plastic substrate.

As the second electrode 1d, it is possible to use a transparent electrode of a film of ITO or an organic conductive material.

The insulating layer 1h can be formed of a colorless transparent insulating resin, such as acrylic resin, epoxy resin, fluorine-based resin, silicone resin, polyimide resin, polystyrene resin, or polyalkene resin.

The partition wall 1g can be formed of a polymeric material through any method including, e.g., a method wherein the partition wall is formed with a photosensitive resin through the photolithographic process, a method wherein the partition wall which has been prepared in advance is bonded to the substrate, a method wherein the partition wall is formed through molding, or the like.

The method of filling the electrophoretic dispersion liquid is not particularly limited but can be an ink jet method using nozzles.

(Application to Microcapsule-Type Electrophoretic Display Device)

The microcapsule 1i containing therein the electrophoretic dispersion liquid described above can be prepared through a known method, such as interfacial polymerization, in situ polymerization, coacervation, or the like.

As a material for the microcapsule 1i, a high light-transmissive material may preferably be used. Examples thereof may include: urea-formaldehyde resin, melamine-formaldehyde resin, polyester, polyurethane, polyamide, polyethylene, polystyrene, polyvinyl alcohol, gelatine, their copolymers, and so on.

The method of forming the microcapsules 1i on the first substrate 1a is not particularly restricted but may be an ink jet method using nozzles.

Incidentally, in order to prevent positional deviation of the microcapsule 1i disposed on the substrate, a light-transmissive resin binder may be filled in a gap between adjacent microcapsules to fix the microcapsules on the substrate. As the resin binder, it is possible to use polyvinyl alcohol, polyurethane, polyester, acrylic resin, silicone resin, etc.

In the case of sealing a spacing between the first and second substrates 1a and 1b, the spacing may preferably be sealed under pressure so that the microcapsule 1i has such a shape that a horizontal length is longer than a vertical length with respect to the first substrate 1a (FIG. 1(b)).

(Electrophoretic Dispersion Medium)

As the electrophoretic dispersion medium, it is possible to use a liquid, which is high insulative and colorless and transparent, including: aliphatic hydrocarbons, such as hexane, cyclohexane, kerosine, normal paraffin, isoparaffin, etc. These may be used singly or in mixture of two or more species.

The electrophoretic dispersion medium may be colored with oil soluble dye having a color of R (red), G (green), B (blue), C (cyan), M (magenta), Y (yellow), etc. Examples of the dye may preferably include azo dyes, anthraquinone dyes, quinoline dyes, nitro dyes, nitroso dyes, penoline dyes, phthalocyanine dyes, metal complex salt dyes, naphthol dyes, benzoquinone dyes, cyanine dyes, indigo dyes, quinoimine dyes, etc. These may be used in combination.

Examples of the oil soluble dye may include Vali Fast Yellow (1101, 1105, 3108, 4120), Oil Yellow (105, 107, 129, 3G, GGS), Vali Fast Red (1306, 1355, 2303, 3304, 3306, 3320), Oil Pink 312, Oil Scarlet 308, Oil Violet 730, Vali Fast Blue (1501, 1603, 1605, 1607, 2606, 2610, 3405). Oil Blue (2N, BOS, 613), Macrolex Blue RR, Sumiplast Green G, Oil Green (502, BG), etc. A concentration of these dyes may preferably be 0.1-3.5 wt. %, per the electrophoretic dispersion medium 1f.

(Electrophoretic Dispersion Liquid)

The dispersion liquid at least contain the electrophoretic particles 1e and the electrophoretic dispersion medium 1f. In order to electrically charge the electrophoretic particles 1e, it is preferable that the above described acidic additive or basic additive is added in the dispersion liquid.

Display Embodiment 1

Figure 2:
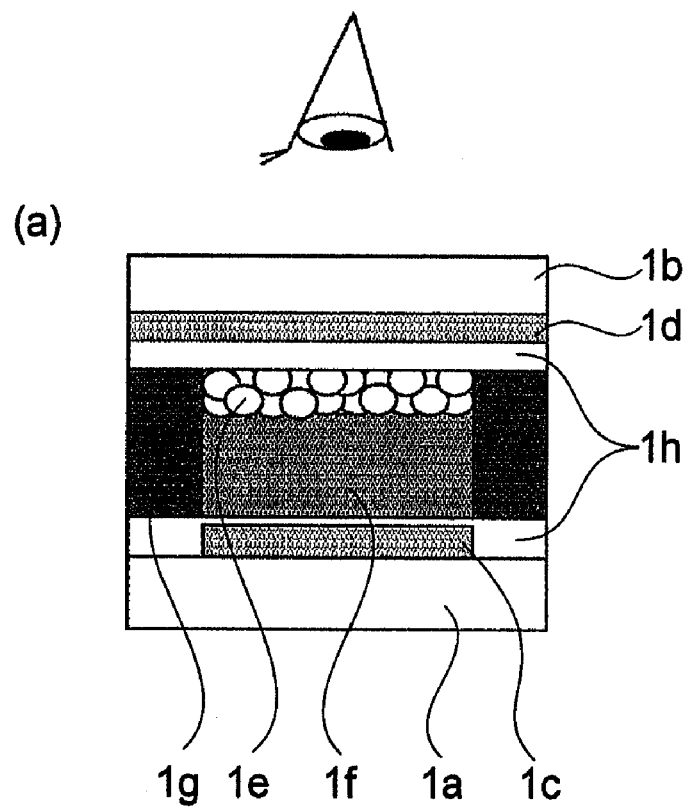
FIGS. 2(a) and 2(b) are schematic views showing a display example of the electrophoretic display device.
Figure 2:
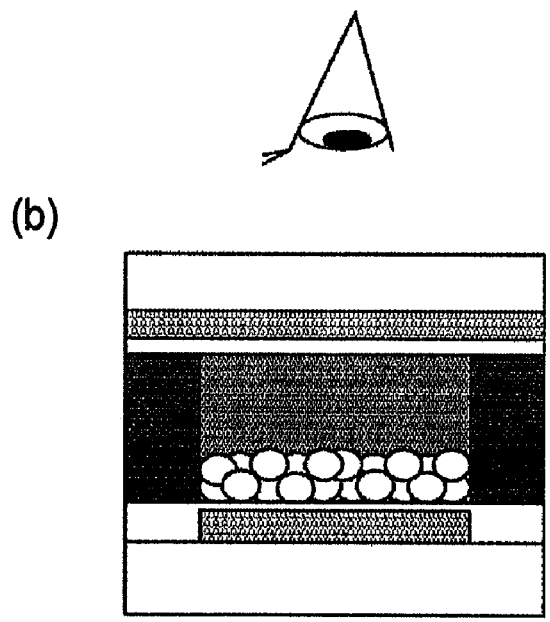

A display embodiment of another electrophoretic display device using the electrophoretic particles 1e according to the present invention is shown in FIGS. 2(a) and 2(b).

FIGS. 2(a) and 2(b) illustrate a display example wherein, e.g., an electrophoretic dispersion liquid comprising white electrophoretic particles 1e and a blue electrophoretic dispersion medium 1f is filled in a cell. The electrophoretic particles 1e is negatively charged in this case.

When the electrophoretic particles 1e are collected on the surface of the second electrode 1d as shown in FIG. 2(a) by applying a negative-polarity voltage to the first electrode 1c while keeping the voltage of the second electrode 1d at 0 V, the cell looks white, attributable to the distribution of the white electrophoretic particles 1e, when viewed from above. On the other hand, when the electrophoretic particles 1e are collected on the surface of the first electrode 1c as shown in FIG. 2(b), by applying a positive-polarity voltage to the first electrode while keeping the voltage of the second electrode 1d at 0 V, the cell looks blue when viewed from above.

Display Embodiment 2

Figure 3:
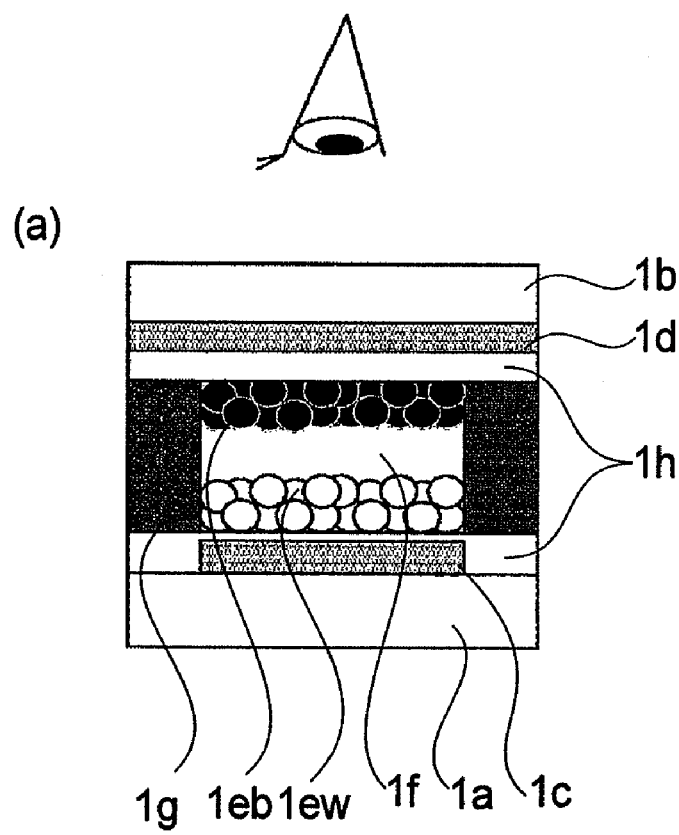
FIGS. 3(a) and 3(b) are schematic views showing another display example of the electrophoretic display device.
Figure 3:
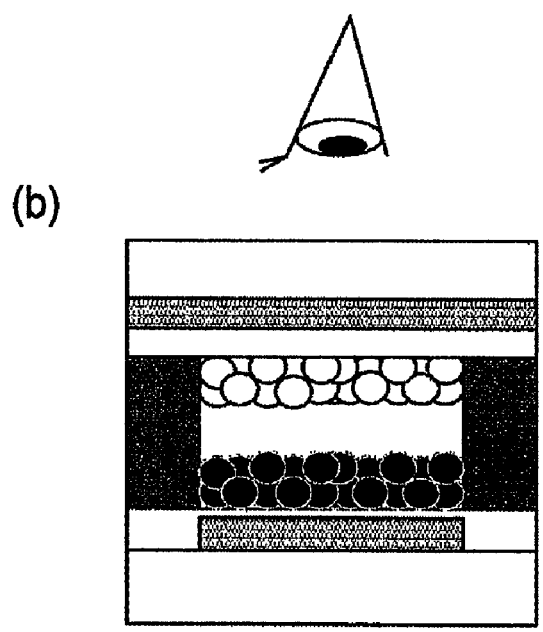

Another display embodiment of the electrophoretic display device using the electrophoretic particles 1e according to the present invention is shown in FIGS. 3(a) and 3(b).

FIGS. 3(a) and 3(b) illustrate a display example wherein, e.g., an electrophoretic dispersion liquid comprising positively charged white electrophoretic particles 1ew, negatively charged black electrophoretic particles 1eb, and a colorless and transparent electrophoretic dispersion medium 1f is filled in a cell.

When the black electrophoretic particles 1eb are collected on the surface of the second electrode 1d and the white electrophoretic particles 1ew are collected on the surface of the first electrode 1c, as shown in FIG. 3(a) by applying a negative-polarity voltage to the first electrode 1c while keeping the voltage of the second electrode 1d at 0 V, the cell looks black, attributable to the distribution of the black electrophoretic particles 1eb, when viewed from above. On the other hand, when the white electrophoretic particles 1ew are collected on the surface of the first electrode 1d and the black electrophoretic particles 1eb are collected on the surface of the first electrode 1c, as shown in FIG. 3(b), by applying a positive-polarity voltage to the first electrode while keeping the voltage of the second electrode 1d at 0 V, the cell looks white, attributable to the distribution of the white electrophoretic particles 1ew, when viewed from above.

The applied voltage varies depending on a charge amount of the electrophoretic particles and a distance between the electrodes but is required to be several volts to several ten volts, and the gradation display can be controlled by the applied voltage and an application time.

By performing such a drive on a pixel-by-pixel basis, it is possible to display an arbitrary image or character by use of a multiplicity of pixels.

(Horizontal Movement-Type Electrophoretic Display Device)

Hereinbelow, an embodiment of a horizontal movement-type electrophoretic display device using electrophoretic particles of the present invention will be described with reference to the drawings.

Figure 4:
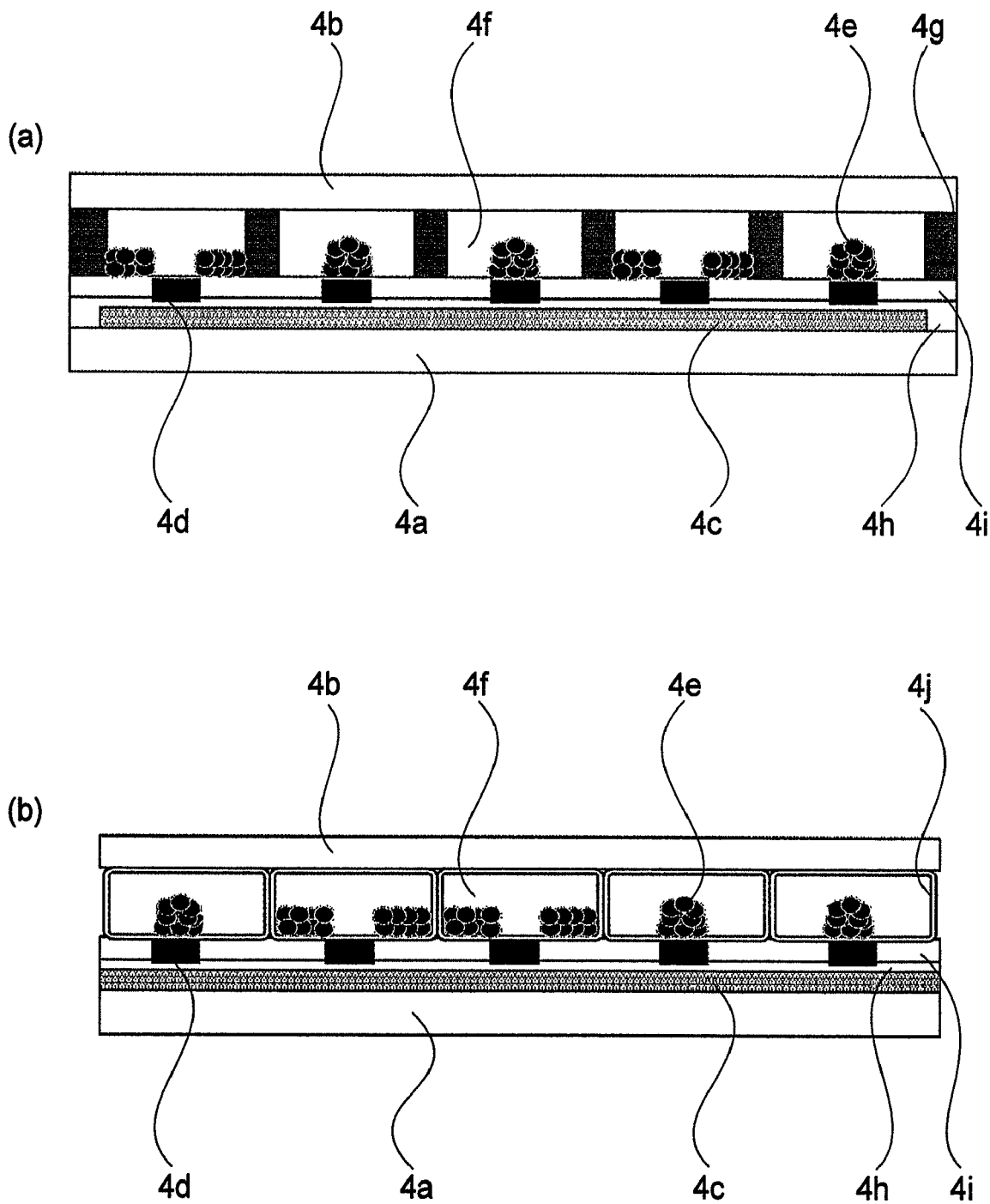
FIGS. 4(a) and 4(b) are schematic sectional views showing another embodiment of an electrophoretic display device using electrophoretic particles of the present invention.

FIGS. 4(a) and 4(b) are schematic sectional views each showing the embodiment of the horizontal movement-type electrophoretic display device using the electrophotographic particles of the present invention.

As shown in FIG. 4(a), the electrophoretic display device includes a first substrate 4a on which a first electrode 4c and a second electrode 4d are disposed. Between the electrodes 4c and 4d and on the second electrode 4d, an insulating layer 4h and an insulating layer 4i are formed, respectively. The insulating layer 4h formed between the electrodes 4c and 4d may be colored or may be colorless and transparent, but the insulating layer 4i is colorless and transparent.

The electrophoretic display device further includes a second substrate 4b disposed opposite to the first substrate 4a with a predetermined spacing through a partition wall 4g. In a cell (space) defined by the pair of first and second substrates 4a and 4b and the partition wall 4g, an electrophoretic dispersion liquid comprising at least electrophoretic particles 4e and an electrophoretic dispersion medium 4f is sealed. A display surface of the electrophoretic display device is located on the second substrate 4b side.

FIG. 4(b) shows an electrophoretic display device using microcapsules. On a first substrate 4a, a plurality of microcapsules 4i each containing the electrophoretic dispersion liquid are disposed and covered with a second substrate 4b. In the case of using the microcapsules 4i, the insulating layer 4i may be omitted.

In FIGS. 4(a) and 4(b), the second electrode 4d comprises a plurality of electrode portions as pixel electrodes capable of independently applying a desired electric field to the electrophoretic dispersion liquid in each cell (or each microcapsule), and the first electrode 4c is a common electrode through which the same potential is applied to the entire display area.

The second electrode 4d (pixel electrode) is provided with an unshown switching element (for each electrode portion) and is supplied with a selection signal from an unshown matrix drive circuit row by row and also supplied with a control signal and an output from an unshown drive transistor column by column. As a result, it is possible to apply a desired electric field to the electrophoretic dispersion liquid (electrophoretic particles 4e) in each of the cells groups.

The electrophoretic particles 4e in each individual cell (or microcapsule) are controlled by an electric field applied through the second electrode 4d, whereby at each pixel, the color (e.g., black) of the electrophoretic particles 4e and the color (e.g., white) of the insulating layer 4h are selectively displayed. By effecting such a drive on a pixel-by-pixel basis, it is possible to effect display of arbitrary images and characters by use of corresponding pixels.

(Constitution of Electrophoretic Display Device)

The first substrate 4a is formed of any insulating member, for supplying the electrophoretic display device, such a glass, plastic, or the like.

The second substrate 4b may be a transparent substrate or a transparent plastic substrate.

The first electrode 4c is a metal electrode of, e.g., Al exhibiting light reflection performance.

The insulating layer 4h formed on the first electrode 4c is formed of a mixture of a transparent colorless insulating resin with light scattering fine particles of, e.g., aluminum oxide or titanium oxide. As a material for the transparent colorless insulating resin, it is possible use the above described insulating resins. Alternatively, it is also possible to use a light scattering method utilizing unevenness at the surface of the metal electrode without using the fine particles.

The second electrode 4d is formed of an electroconductive material, which looks dark black from the viewer side of the electrophoretic display device, such as titanium carbide, black-treated Cr, and Al or Ti provided with a black surface layer. Pattern formation of the second electrode 5 may be performed through a photolithographic process.

On the second electrode 4d, the insulating layer 4i is formed of, e.g., the transparent colorless insulating resin described above.

In this embodiment, a display contrast is largely depend on an areal ratio between the second electrode 4d (each electrode portion) and an associated pixel, so that an exposed area of the second electrode 4d is required to be smaller than that of the pixel in order to enhance a contrast. For this reason, it is preferable that the areal ratio therebetween may ordinarily be 1:2 to 1:5.

The partition wall 4g may be formed in the same manner as described above. The method of filling the above described electrophoretic dispersion liquid in the cell is not limited particularly but may be the above described ink jet method using nozzles.

(Application to Microcapsule-Type Electrophoretic Display Device)

The microcapsule 4j containing the electrophoretic dispersion liquid can be prepared by the known method as described above, such as interfacial polymerization, in situ polymerization, coacervation, and so on. The material for forming the microcapsule 3j may be the same polymer as described above.

The method of forming the microcapsules 4j on the first substrate 4a is not particularly restricted but may be the above described ink jet method using nozzles;

Incidentally, in order to prevent positional deviation of the microcapsule 4i disposed on the substrate, a light-transmissive resin binder may be filled in a gap between adjacent microcapsules to fix the microcapsules on the substrate. As the resin binder, it is possible to use the above described resin.

In the case of sealing a spacing between the first and second substrates 4a and 4b, the spacing may preferably be sealed under pressure so that the microcapsule 4i has such a shape that a horizontal length is longer than a vertical length with respect to the first substrate 1a (FIG. 4(b)).

(Electrophoretic Dispersion Medium)

As the electrophoretic dispersion medium 4f, it is possible to use the above described liquids.

(Electrophoretic Particles)

As the electrophoretic particles 4e, it is possible to use black particles (obtained by the same method as that described above). In this embodiment, a concentration of the electrophotographic particles 4e may preferably 0.5-10 wt. %, more preferably 1-5 wt. %, per the weight of the electrophoretic dispersion medium 4f although it varies depending on the particle size of the electrophoretic particles 4f. When the concentration of the electrophotographic particles 4e is less than 0.5 wt. %, the first electrode 4c cannot be covered completely, so that a display contrast is undesirably lowered. Further, when the concentration of the electrophotographic particles 4e exceeds 10 wt. %, the electrophotographic particles extend off the colored second electrode 4d, thus undesirably lowering the display contrast.

Display Embodiment

Figure 5:
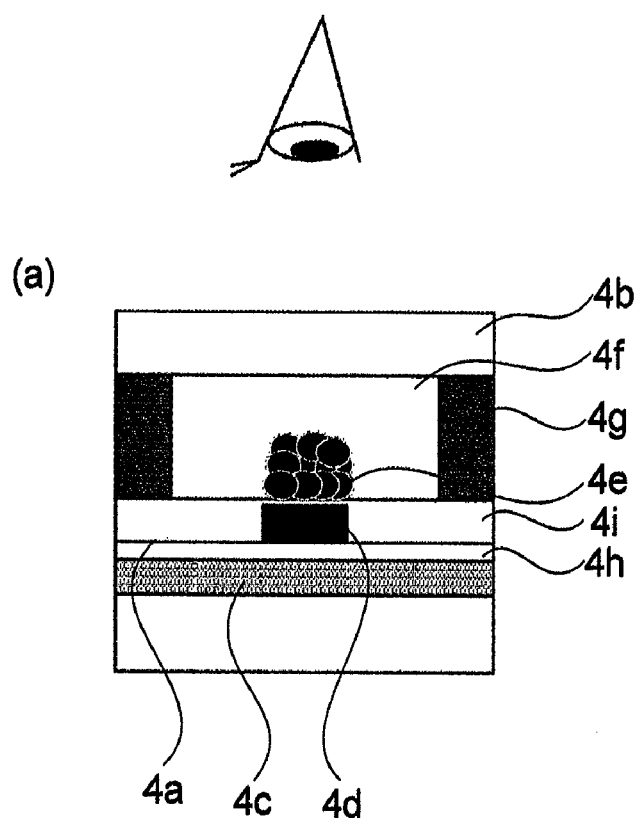
FIGS. 5(a) and 5(b) are schematic views showing a display example of the electrophoretic display device of the another embodiment.
Figure 5:
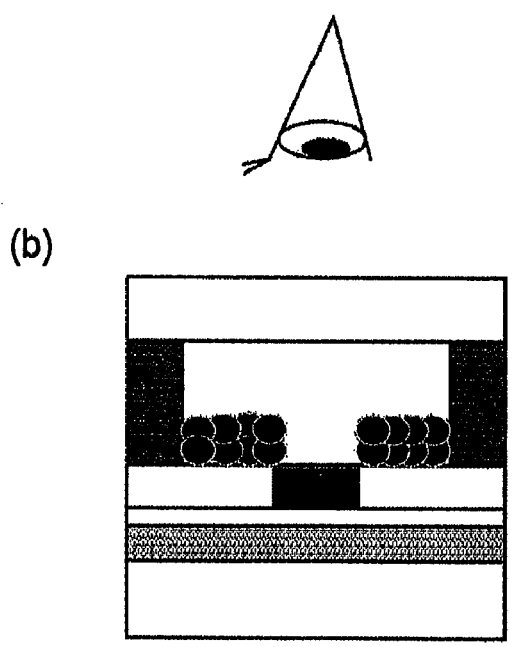

A display embodiment of the horizontal movement-type electrophoretic display device using the electrophoretic particles according to this embodiment is shown in FIGS. 5(a) and 5(b).

FIGS. 5(a) and 5(b) illustrate a display example wherein, e.g., an electrophoretic dispersion liquid comprising black electrophoretic particles 3e and a colorless and transparent electrophoretic dispersion medium 4f is filled in a cell. The electrophoretic particles 4e is negatively charged in this case.

In the case where the color of the surface of the insulating layer 4h is white and the color of the surface of the second electrode 4d is black, when the electrophoretic particles 4e are collected on the surface of the second electrode 4d as shown in FIG. 5(a) by applying a positive-polarity voltage to the second electrode while keeping the voltage of the first electrode 4c at 0 V, the cell looks white when viewed from above.

The applied voltage varies depending on a charge amount of the electrophoretic particles and a distance between the electrodes but is required to be several volts to several ten volts, and the gradation display can be controlled by the applied voltage and an application time.

By performing such a drive on a pixel-by-pixel basis, it is possible to display an arbitrary image or character by use of a multiplicity of pixels.

(2) Embodiments According to Second Invention

In an embodiment according to the second aspect of the present invention electrophoretic particles are particles provided with a polymer chain connected to a surface of pigment particle, and the polymer chain comprises a polymer, having a high affinity for a hydrocarbon dispersion medium, obtained through living radical polymerization from the living radical polymerization initiation group located at the pigment particle surface. As a result, it is possible to obtain electrophoretic particles having a high dispersion function while preventing agglomeration of particles in the dispersion medium.

Further, by connecting a polymer chain having a high (electrical) charge function, it is possible to enhance the charge function of the resultant electrophoretic particles. It is also possible to form a polymer chain comprising a copolymer, particularly a block copolymer, consisting of the polymer chain having the charge function and the polymer chain having the dispersion function.

The electrophoretic particles are obtained by introducing the living radical polymerization initiation group to the pigment particle surface and grafting the polymer chain from the living radical polymerization initiation group by living radical polymerization.

The living radical polymerization may be classified into atom transfer radical polymerization, bb polymerization nitroxide-mediated, etc. The living radical polymerization may be any type thereof since the polymer chain having an affinity for the dispersion medium can be obtained by appropriately selecting monomers described later. The nitroxide-mediated polymerization may also preferably used in this (Second) invention since no catalyst is employed and thus the resultant electrophoretic particles are less liable to caused a color change.

In this invention, the living radical polymerization is used, so that it is possible to arbitrarily design the kinds of monomers, a degree of polymerization, formation of copolymer, etc. As a result, it is possible to finely control the chargeability and dispersibility of the polymer chain.

The electrophoretic particles in this invention can be utilized in the electrophoretic display device or in the field of electrophotography using liquid toner.

(Introduction of Polymerization Initiation Group)

With respect to the cases where the living radical polymerization is the atom transfer radical polymerization and is the nitroxide-mediated polymerization, an introduction method of the polymerization initiation group will be described.

In the case where the living radical polymerization is the nitroxide-mediated polymerization, in accordance with a reaction formula (2-I) shown below, it is possible to introduce the nitroxide-mediated polymerization initiation group to the surface of pigment particle. More specifically, in a reaction solvent, the pigment particles and Precursor 1 (shown below) of the nitroxide-mediated polymerization initiation group are added and reacted with each other to introduce the nitroxide-mediated polymerization initiation group to the surface of pigment particle. Triethoxysilyl group of Precursor 1 may be trimethoxysilyl group or trichlorosilyl group.

Reaction formula (2-I)

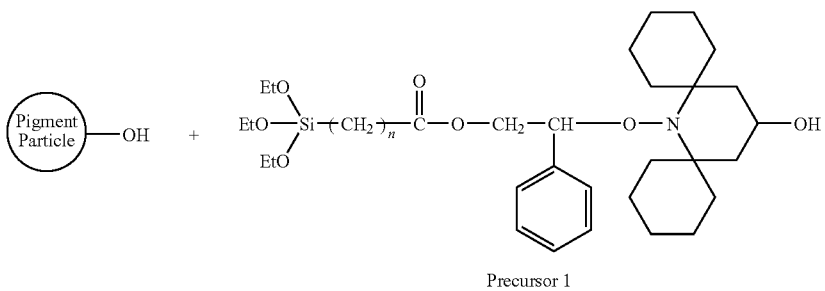

Precursor 1

-continued

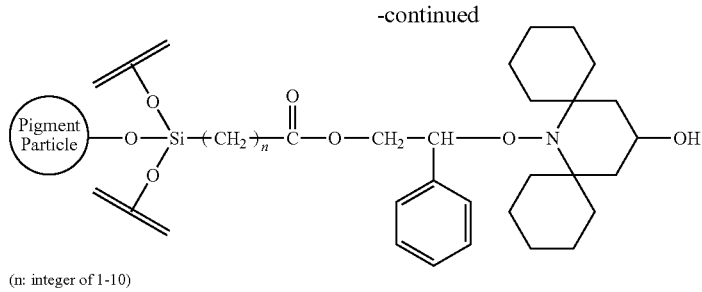

(n: integer of 1-10)

The pigment particles may preferably have a function group, capable of reacting with the precursor of the nitroxide-mediated polymerization initiation group, such as hydroxyl group. When the pigment particles have no function group, the pigment particles may preferably be appropriately surface-treated to introduce the function group to a surface of pigment particles.

The reaction solvent is not particularly limited but it is possible to use dimethylsulfoxide, dimethylformamide, benzene, toluene, xylene, etc.

In the reaction formula (2-I) shown above, Precursor 1 of the nitroxide-mediated polymerization initiation group may be replaced with Precursors 2 to 13 shown in the embodiment of First invention. The triethoxysilyl group in the precursors may be replaced with trimethoxysilyl group or trichlorosilyl group.

In the case where the living radical polymerization is the atom transfer radical polymerization, in accordance with a reaction formula (2-II) shown below, it is possible to introduce the atom transfer radical polymerization initiation group to the surface of pigment particle. More specifically, in a reaction solvent, the pigment particles and Precursor 14 (shown below) of the atom transfer radical polymerization initiation group are added and reacted with each other to introduce the atom transfer radical polymerization initiation group to the surface of pigment particle. Trichlorosilyl group of Precursor 1 may be trimethoxysilyl group or triethoxysilyl group.

Reaction Formula (2-II)

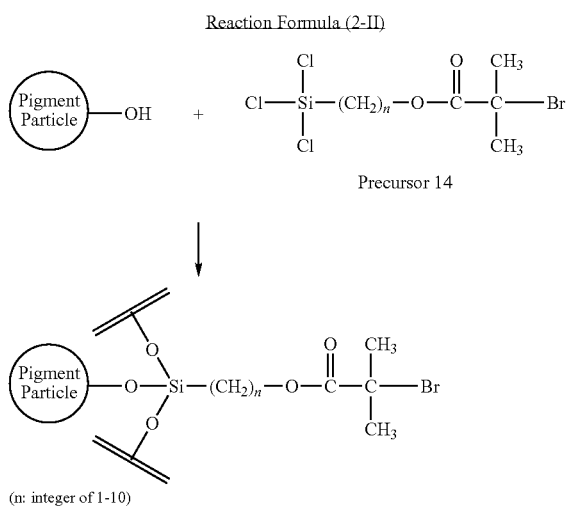

(n: integer of 1-10)

The pigment particles may preferably have a function group, capable of reacting with the precursor of the atom transfer radical polymerization initiation group, such as hydroxyl group. When the pigment particles have no function group, the pigment particles may preferably be appropriately surface-treated to introduce the function group to a surface of pigment particles.

The reaction solvent is not particularly limited but it is possible to use dimethylsulfoxide, dimethylformamide, benzene, toluene, xylene, etc.

In the reaction formula (2-II) shown above, Precursor 1 of the atom transfer radical polymerization initiation group may be replaced with Precursors 15 to 17 shown below, wherein n is an integer of 1-10 and trichlorosilyl group may be replaced with trimethoxysilyl group or triethoxysilyl group.

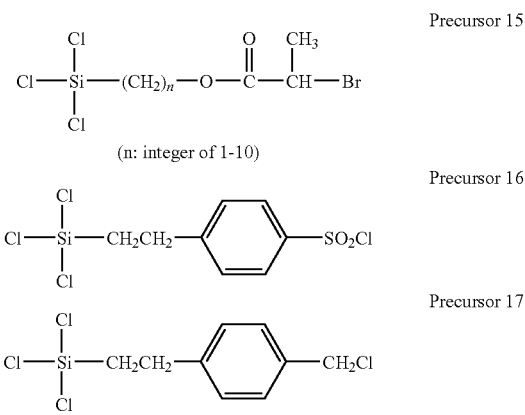

(Living Radical Polymerization)

With respect to the case where the living radical polymerization is the nitroxide-mediated polymerization, grafting of the polymer chain will be described. It is possible to easily form polymer chains having a uniform chain length at the surfaces of core particles by using, as the core particles, the pigment particles provided with the introduced nitroxide-mediated polymerization initiation group through the reaction formula (2-I).

After the core particles are dispersed in the reaction solvent, a polymerizable monomer for constituting the polymer chain is added and then an atmosphere of the reaction system is replaced with inert gas to effect the atom transfer radical polymerization.

The reaction solvent is not particularly limited so long as the pigment particles are dispersed in the reaction solvent. Examples of the reaction solvent may include dimethyl sulfoxide, dimethylformamide, benzene, toluene, xylene, diphenyl ether, etc. Alternatively, the polymerization may be performed without using the reaction solvent.

As the inert gas, it is possible to use nitrogen or argon.

A polymerization temperature is in the range of 40-150° C., preferably 60-120° C. Below 40° C., the polymer chain formed undesirably has a low molecular weight and the polymerization does not readily proceed.

During the polymerization, it is preferable that a free polymerization initiation group (species) which is not fixed at the particle surface is added. As free polymer obtained from the free polymerization initiation group can be used as an index of a molecular weight and a molecular weight distribution of the polymer chain grafted to the particle.

As the free polymerization initiation group, it is preferable that the same group as the nitroxide-mediated polymerization initiation group fixed at the particle surface is selected. More specifically, with respect to the particles obtained through the reaction formula (1-I), nitroxide similar to Precursor 1 is preferred.

After the reaction, the formed particles are separated and purified by an appropriate method, such as filtration, decantation, precipitation fractionation, centrifugation, or the like, and then are subjected t drying and classification to obtain electrophoretic particles.

(Atom Transfer Radical Polymerization)

Next, the case where the living radical polymerization is the atom transfer radical polymerization will be described.

By using, as the core particles, the pigment particles to which the atom transfer radical polymerization initiation group is introduced through the reaction formula (2-II), it is possible to easily form polymer chains having a uniform chain length at the surfaces of core particles.

After the core particles are dispersed in the reaction solvent, a polymerizable monomer for constituting the polymer chain and a transfer metal complex are added and then an atmosphere of the reaction system is replaced with inert gas to effect the atom transfer radical polymerization.

The reaction solvent is not particularly limited so long as the core particles are dispersed in the reaction solvent. Examples of the reaction solvent may include dimethyl sulfoxide, dimethylformamide, acetonitrile, pyridine, methanol, ethanol, propanol, butanol, pentanol, hexanol, heptanol, cyclohexanol, methyl cellosolve, ethyl cellosolve, isopropyl cellosolve, butyl cellosolve, acetone, methyl ethyl ketone, methyl isobutyl ketone, cyclohexanone, ethyl acetate, butyl acetate, ethyl propionate, dimethyl ether, diethyl ether, trioxane, tetrahydrofuran, pentane, cyclopentane, hexane, cyclohexane, heptane, octane, nonane, decane, benzene, toluene, xylene, ethylbenzene, methoxybenzene, etc. These may be used singly or in combination of two or more species.

As the inert gas, it is possible to use nitrogen or argon.

The transfer metal complex used comprises halogenated metal and a ligand. As a metal species of the halogenated metal, transfer metal from Ti (atomic member: 22) to Zn (atomic number: 30) are preferred. Of these, Fe, Co, Ni and Cu are further preferred. As the halogenated metal, cuprous chloride and cuprous bromide are particularly preferred.

The ligand is not particularly limited so long as it is capable of coordinating with the halogenated metal. Example thereof may include: 2,2'-bipyridyl, 4,4'-di-(n-heptyl)-2,2'-bipyridyl, 2-(N-pentyliminomethyl) pyridine, (−)-sparteine, tris(2-dimethylaminoethyl)amine, ethylenediamine, dimethylglyoxime, 1,4,8,11-tetramethyl-1,4,8,11-tetraazocyclotetradecane, 1,10-phenanthroline, N,N,N',N'',N''-pentamethyldiethyltriamine, hexamethyl(2-aminoethyl)amine, etc.

The metal transfer complex may preferably be added in an amount of 0.001-10 wt. %, more preferably 0.05-5 wt. %, with respect to the polymerizable monomer constituting the polymer chain.

A polymerization temperature is in the range of 40-100° C., preferably 50-80° C. Above 100° C., the polymer fine particles are undesirably melted. Below 40° C., the polymer chain formed undesirably has a low molecular weight and the polymerization does not readily proceed.

During the polymerization, it is preferable that a free polymerization initiation group (species) which is not fixed at the particle surface is added. As free polymer obtained from the free polymerization initiation group can be used as an index of a molecular weight and a molecular weight distribution of the polymer chain grafted to the particle.

As the free polymerization initiation group, it is preferable that the same group as the atom transfer radical polymerization initiation group fixed at the particle surface is selected. More specifically, with respect to the particles obtained through the reaction formula (1-II), 2-bromo ethyl isobutyrate is preferred. With respect to the particles provided with a fixed Precursor 15 at a surface of each particle, 2-bromo ethyl propionate is preferred.

After the reaction, the formed particles are separated and purified by an appropriate method, such as filtration, decantation, precipitation fractionation, centrifugation, or the like, and then are subjected to drying and classification to obtain electrophoretic particles.

(Dispersion Function and Charge Function of Polymer Chain)

The electrophoretic particles in this invention have an electric charge function and a dispersion function.

First, the polymer chain having the dispersion function will be described.

The polymer chain having the dispersion function is characterized in that it is a polymer having a high affinity for the electrophoretic dispersion medium. The high affinity means that the polymer chain and the electrophoretic dispersion medium are excellent in mutual solubility without causing phase separation. The polymer chain has a stearic-exclusion effect of preventing agglomeration between particles by possessing an expanse in the electrophoretic dispersion medium.

As the polymerizable monomer providing the polymer chain having the dispersion function, as described above, the resultant polymer is required to have the high affinity with the electrophoretic dispersion medium. Examples of the polymerizable monomer may include 1-hexene, 1-heptene, 1-octene, 1-decene, butadiene, isoprene, isobutylene, etc. These may be used singly or in combination of two or more species.

Next, the polymer chain having the charge function will be described.

As the polymerizable monomer providing the polymer chain having the charge function, it is possible to use a basic polymerizable monomer, an acidic polymerizable monomer, and a fluorine-containing polymerizable monomer.

Examples of the basic polymerizable monomer may include those, such as methyl(meth-)acrylate, as described in the embodiments of First invention.

When an acidic additive is added to the polymer chain obtained from the basic polymerizable monomer, an acid-base interaction between these substances are caused to occur, thus imparting positive chargeability to the particles.

Further, the polymer chain having the charge function can also have the dispersion function by appropriately selecting the kinds of the basic polymerizable monomer and the acidic additive and by appropriately adjusting an addition amount of the acidic additive, so that it is not necessary to effect grafting of the polymerizable monomer having the dispersion substance to the particle.

As the acidic additive, an acidic substance which is soluble in the electrophoretic dispersion medium is preferred. For example, it is possible to use rosin acid, rosin ester, rosin acid derivative, poly(meth-)acrylic acid, polyisobutylenesuccinic acid anhydride, etc.

An addition amount of the acidic additive may appropriately added depending on the kind thereof but may preferably be 0.001-10 wt. %, preferably 0.01-5 wt. %, with respect to the electrophoretic dispersion medium.

On the other hand, examples of the acidic polymerizable monomer may include those, such as (meth-)acrylic acid, as described in the embodiments of First invention.

When a basic additive is added to the polymer chain obtained from the acidic polymerizable monomer, an acid-base interaction between these substances are caused to occur, thus imparting negative chargeability to the particles. Further, the polymer chain having the charge function can also have the dispersion function by appropriately selecting the kinds of the acidic polymerizable monomer and the basic additive and by appropriately adjusting an addition amount of the basic additive, so that it is not necessary to effect grafting of the polymerizable monomer having the dispersion substance to the particle.

As the basic additive, a basic substance which is soluble in the electrophoretic dispersion medium is preferred. For example, it is possible to use those, such as polyisobutylsuccinimide, as described in the embodiments of First invention.

An addition amount of the basic additive may appropriately added depending on the kind thereof but may preferably be 0.001-10 wt. %, preferably 0.01-5 wt. %, with respect to the electrophoretic dispersion medium.

Further, examples of the fluorine-containing polymerizable monomer may include those, such as (meth-)acrylate, as described in the embodiments of First invention.

The polymer chain obtained from the fluorine-containing polymerizable monomer has fluorine (atom) which has a large electronegativity, so that it is possible to impart negative chargeability to the particle. The polymer chain has such an affinity with the electrophoretic dispersion medium that it is not so high, thus being preferably one obtained through block polymerization between the fluorine-containing polymerizable monomer and the polymerizable monomer having the dispersion function.

The grafted polymer chain is characterized in that it has a molecular weight distribution index (weight-average molecular weight/number-average molecular weight) which is controlled to be not more than 1.8, preferably not more than 1.5, further preferably not more than 1.3. When the molecular weight distribution index of the grafted polymer chain is in the range, the chain length of polymer chain becomes uniform, so that it is possible to suppress unevenness in dispersibility and chargeability of the electrophoretic particles.

The number-average molecular weight may appropriately be determined depending on whether the polymer chain is of the dispersion function-type or the charge function-type. In the case where the polymer chain is of the dispersion function-type, the number-average molecular weight may preferably be in the range of 500-1,000,000, more preferably 1,000-500,000. By forming the polymer chain having the molecular weight in this range, the dispersion function can be readily performed and the solubility in the electrophoretic dispersion medium can be kept.

A graft density of the polymer chain can be controlled by a degree of introduction of living radical polymerization initiation group or the nitroxide-mediated polymerization initiation group. Further, the chain length of the polymer chain can be controlled by the addition amount of the polymerizable monomer, the polymerization time, etc.

(Pigment)

As the pigment particles constituting the electrophoretic particles, it is possible to use an organic pigment particles, inorganic pigment particles, etc.

Examples of the organic pigment particles may include those, such as azo pigments particles, as described in the embodiments of First invention.

Examples of the inorganic pigment particles may include those, such as white pigments particles, as described in the embodiments of First invention.

The pigment may preferably have an average particle size of 10-500 nm, more preferably 20-200 nm. Below 10 nm, a handling characteristic is undesirably lowered considerably. Above 500 nm, a degree of pigmentation ((color) definition) of the pigment is desirably lowered.

(Application to Electrophoretic Display Device)

Similarly as in the embodiments of the electrophoretic display devices described in the First invention with reference to the FIGS. 1 to 5, the electrophoretic particles in this (Second) invention are also applicable to the electrophoretic display devices described in First invention.

Hereinbelow, First invention will be described more specifically based on Examples but is not limited thereto.

Example 1-1

In toluene, titanium oxide particles (average particle size: 200 nm, having hydroxy group at particle surface) and Precursor 1 (n=10) of nitroxide-mediated polymerization initiation group are reacted with each other to introduce nitroxide-mediated polymerization initiation group at the particle surface of titanium oxide particles. After the titanium oxide particles are dispersed in toluene, in the resultant system, dodecyl acrylate is added. The reaction system is aerated with nitrogen and subjected to nitroxide-mediated polymerization at 90° C. for a predetermined time. In this case, nitroxide similar to Precursor 1 of the nitroxide-mediated polymerization initiation group as a free polymerization initiation group (radical) is added in the reaction system in advance so as to provide an index of molecular weight and molecular weight distribution of a polymer chain grafted to the particle surface of titanium oxide particles.

After the polymerization, the resultant polymer particles are washed, followed by purification and drying to obtain objective electrophoretic particles.

The electrophoretic particles are well dispersed in chloroform, so that it is possible to confirm that dodecyl polyacrylate is grafted at the particle surface of titanium oxide. Further, when a polymer obtained from Nitroxide 1 added as the free polymerization initiation group is subjected to measurement of molecular weight and molecular weight distribution, the polymer has a number-average molecular weight of about 50,000 and a molecular weight dispersion index (weight-average molecular weight/number-average molecular weight) of 1.20. As a result, it is possible to confirm that the polymer chains grafted to the core particles have a uniform chain length.

An electrophoretic dispersion liquid is prepared by using 5 wt. % of the electrophoretic particles (white particles), 0.1 wt. % of a colorant ("Oil Blue N", mfd. by Aldrich Co.), 2.5 wt. % of rosin acid (acidic additive), and 92.9 wt. % of an electrophoretic dispersion medium ("Isoper H, mfd. by Exxon Corp.). The electrophoretic particles are positively charged by acid-base interaction between the grafted dodecyl polyacrylate and rosin acid. Further, the grafted dodecyl polyacrylate has an expanse in the electrophoretic dispersion medium, thus having also a dispersion function.

The electrophoretic dispersion liquid is injected into a cell by using nozzles according to an ink jet method to provide an electrophoretic display device, as shown in FIG. 1(a), which is connected with a voltage application circuit.

When the resultant electrophoretic display device is subjected to contrast display for a long time by driving it at a drive voltage of ±10 V, the electrophoretic particles are excellent in dispersibility, chargeability and (color) definition, and it is possible to effect clear blue/white display.

Example 1-2

A plurality of microcapsules 1i each containing an electrophoretic dispersion liquid prepared in the same manner as in Example 1-1 are prepared by in-situ polymerization method. Each microcapsule is formed of urea-formaldehyde resin as a film-forming material. An electrophoretic display device, as shown in FIG. 1(b), which is connected with a voltage application circuit is prepared by disposing the plurality of microcapsules 1i on a first substrate 1a by use of nozzles according to the ink jet method.

When the resultant electrophoretic display device is subjected to contrast display for a long time by driving it at a drive voltage of ±10 V, the electrophoretic particles are excellent in dispersibility, chargeability, and (color) definition and it is possible to effect clear blue/white display.

Example 1-3

In toluene, magnetite particles (average particle size: 200 nm, having hydroxy group at particle surface) and Precursor 1 (n=10) of nitroxide-mediated polymerization initiation group are reacted with each other to introduce nitroxide-mediated polymerization initiation group at the particle surface of magnetite particles. After the magnetite particles are dispersed in toluene, in the resultant system, dodecyl acrylate is added. The reaction system is aerated with nitrogen and subjected to nitroxide-mediated polymerization at 90° C. for a predetermined time. In this case, nitroxide similar to Precursor 1 of the nitroxide-mediated polymerization initiation group as a free polymerization initiation group (radical) is added in the reaction system in advance so as to provide an index of molecular weight and molecular weight distribution of a polymer chain grafted to the particle surface of magnetite particles.

After the polymerization, the resultant polymer particles are washed, followed by purification and drying to obtain objective electrophoretic particles 4e.

The electrophoretic particles 4e are well dispersed in chloroform, so that it is possible to confirm that octadecyl polyacrylate is grafted at the particle surface of magnetite. Further, when a polymer obtained from the nitroxide added as the free polymerization initiation group is subjected to measurement of molecular weight and molecular weight distribution, the polymer has a number-average molecular weight of about 80,000 and a molecular weight dispersion index (weight-average molecular weight/number-average molecular weight) of 1.26. As a result, it is possible to confirm that the polymer chains grafted to the magnetite particles have a uniform chain length.

An electrophoretic dispersion liquid is prepared by using 1 wt. % of the electrophoretic particles 4e (black particles), 0.5 wt. % of rosin acid (acidic additive), and 98.5 wt. % of an electrophoretic dispersion medium 4f ("Isoper H, mfd. by Exxon Corp.). The electrophoretic particles 4e are positively charged by acid-base interaction between the grafted octadecyl polyacrylate and rosin acid. Further, the grafted octadecyl polyacrylate has an expanse in the electrophoretic dispersion medium 4f, thus having also a dispersion function.

The electrophoretic dispersion liquid is injected into a cell by using nozzles according to an ink jet method to provide an electrophoretic display device, as shown in FIG. 4(a), which is connected with a voltage application circuit.

When the resultant electrophoretic display device is subjected to contrast display for a long time by driving it at a drive voltage of ±10 V, the electrophoretic particles 4e are excellent in dispersibility, chargeability and (color) definition, and it is possible to effect clear white/black display.

Example 1-4

A plurality of microcapsules 4j each containing an electrophoretic dispersion liquid prepared in the same manner as in Example 1-3 are prepared by interfacial polymerization method. Each microcapsule is formed of polyamide resin as a film-forming material. An electrophoretic display device, as shown in FIG. 4(b), which is connected with a voltage application circuit is prepared by disposing the plurality of microcapsules 4j on a first substrate 4a by use of nozzles according to the ink jet method.

When the resultant electrophoretic display device is subjected to contrast display for a long time by driving it at a drive voltage of ±10 V, the electrophoretic particles 4e are excellent in dispersibility, and chargeability, and it is possible to effect clear white/black display.

Example 1-5

In toluene, magnetite particles (average particle size: 200 nm, having hydroxy group at particle surface) and Precursor 5 (n=10) of nitroxide-mediated polymerization initiation group are reacted with each other to introduce nitroxide-mediated polymerization initiation group at the particle surface of magnetite particles. After the magnetite particles are dispersed in dimethylformamide, in the resultant system, acrylic acid is added. The reaction system is aerated with nitrogen and subjected to nitroxide-mediated polymerization at 100° C. for a predetermined time. After acrylic acid is consumed, isoprene is added to the reaction system in a molar ratio of (acrylic acid):(isoprene)=1:9 to form a graft polymer chain of block copolymer. In this case, nitroxide similar to Precursor 5 of the nitroxide-mediated polymerization initiation group as a free polymerization initiation group (radical) is added in the reaction system in advance so as to provide an index of molecular weight and molecular weight distribution of a polymer chain grafted to the particle surface of magnetite particles.

After the polymerization, the resultant polymer particles are washed, followed by purification and drying to obtain objective electrophoretic particles 4e.

The electrophoretic particles 4e are well dispersed in chloroform, so that it is possible to confirm that block copolymer of polyacrylic acid and polyisoprene is grafted at the particle surface of magnetite. Further, when a polymer obtained from the nitroxide added as the free polymerization initiation group is subjected to measurement of molecular weight and molecular weight distribution, the polymer has a number-average molecular weight of about 70,000 and a molecular weight dispersion index (weight-average molecular weight/number-average molecular weight) of 1.28. As a result, it is possible to confirm that the polymer chains grafted to the magnetite particles are the block copolymer having a uniform chain length.

An electrophoretic dispersion liquid is prepared by using 1 wt. % of the electrophoretic particles 4e (black particles), 0.5 wt. % of polyisobutylenesuccinimide (basic additive), and 98.5 wt. % of an electrophoretic dispersion medium 4f ("Isoper H, mfd. by Exxon Corp.). The electrophoretic particles 4e are positively charged by acid-base interaction between the grafted polyacrylic acid site of the block copolymer and polyisobutylenesuccinimide. Further, the grafted polyisoprene site of the block copolymer has an expanse in the electrophoretic dispersion medium 4f, thus having a dispersion function.

The electrophoretic dispersion liquid is injected into a cell by using nozzles according to an ink jet method to provide an electrophoretic display device, as shown in FIG. 4(a), which is connected with a voltage application circuit.

When the resultant electrophoretic display device is subjected to contrast display for a long time by driving it at a drive voltage of ±10 V, the electrophoretic particles 4e are excellent in dispersibility, chargeability and (color) definition, and it is possible to effect clear white/black display.

Example 1-6

A plurality of microcapsules 4j each containing an electrophoretic dispersion liquid prepared in the same manner as in Example 1-5 are prepared by interfacial polymerization method. Each microcapsule is formed of polyamide resin as a film-forming material. An electrophoretic display device, as shown in FIG. 4(b), which is connected with a voltage application circuit is prepared by disposing the plurality of microcapsules 4j on a first substrate 4a by use of nozzles according to the ink jet method.

When the resultant electrophoretic display device is subjected to contrast display for a long time by driving it at a drive voltage of ±10 V, the electrophoretic particles 4e are excellent in dispersibility, chargeability and (color) definition, and it is possible to effect clear white/black display.

Example 1-7

A nitroxide-mediated polymerization initiation group is introduced to each particle surface of magnetite particles in the same manner as in Example 1-5. After the magnetite particles are dispersed in dimethylformamide, in the resultant system, aminoethyl acrylate is added. The reaction system is aerated with nitrogen and subjected to nitroxide-mediated polymerization at 100° C. for a predetermined time. After aminoethyl acrylate is consumed, isoprene is added to the reaction system in a molar ratio of (aminoethyl acrylate):(isoprene)=1:9 to form a graft polymer chain of block copolymer. In this case, nitroxide similar to Precursor 5 of the nitroxide-mediated polymerization initiation group as a free polymerization initiation group (radical) is added in the reaction system in advance so as to provide an index of molecular weight and molecular weight distribution of a polymer chain grafted to the particle surface of magnetite particles.

After the polymerization, the resultant polymer particles are washed, followed by purification and drying to obtain objective electrophoretic particles 4e.

The electrophoretic particles 4e are well dispersed in chloroform, so that it is possible to confirm that block copolymer of polyacrylic acid and polyisoprene is grafted at the particle surface of magnetite. Further, when a polymer obtained from the nitroxide added as the free polymerization initiation group is subjected to measurement of molecular weight and molecular weight distribution, the polymer has a number-average molecular weight of about 60,000 and a molecular weight dispersion index (weight-average molecular weight/number-average molecular weight) of 1.29. As a result, it is possible to confirm that the polymer chains grafted to the magnetite particles are the block copolymer having a uniform chain length.

An electrophoretic dispersion liquid is prepared by using 1 wt. % of the electrophoretic particles 4e (black particles), 0.5 wt. % of rosin acid (acidic additive), and 98.5 wt. % of an electrophoretic dispersion medium 4f ("Isoper H, mfd. by Exxon Corp.). The electrophoretic particles 4e are positively charged by acid-base interaction between the grafted polyaminoethyl acrylate site of the block copolymer and polyisobutylenesuccinimide. Further, the grafted polyisoprene site of the block copolymer has an expanse in the electrophoretic dispersion medium 4f, thus having a dispersion function.

The electrophoretic dispersion liquid is injected into a cell by using nozzles according to an ink jet method to provide an electrophoretic display device, as shown in FIG. 4(a), which is connected with a voltage application circuit.

When the resultant electrophoretic display device is subjected to contrast-display for a long time by driving it at a drive voltage of ±10 V, the electrophoretic particles 4e are excellent in dispersibility, chargeability and (color) definition, and it is possible to effect clear white/black display.

Example 1-8

A plurality of microcapsules 4j each containing an electrophoretic dispersion liquid prepared in the same manner as in Example 1-7 are prepared by in-situ polymerization method. Each microcapsule is formed of melamine-formaldehyde resin as a film-forming material. An electrophoretic display device, as shown in FIG. 4(b), which is connected with a voltage application circuit is prepared by disposing the plurality of microcapsules 4j on a first substrate 4a by use of nozzles according to the ink jet method.

When the resultant electrophoretic display device is subjected to contrast display for a long time by driving it at a drive voltage of ±10 V, the electrophoretic particles 4e are excellent in dispersibility, chargeability and (color) definition, and it is possible to effect clear white/black display.

Example 1-9

An electrophoretic dispersion liquid is prepared by using 5 wt. % of electrophoretic particles (white particles) obtained in the same manner as in Example 1-1, 2.5 wt. % of rosin acid (acidic additive), 3 wt. % of electrophoretic particles (black particles) obtained in the same manner as in Example 1-5, 1.5 wt. % of polyisobutylenesuccinimide (basic additive), and 88 wt. % of an EDM (Isoper H). In the electrophoretic dispersion liquid, the white electrophoretic particles are positively charged and the black electrophoretic particles are negatively charged.

The electrophoretic dispersion liquid is injected into a cell by using nozzles according to an ink jet method to provide an electrophoretic display device, as shown in FIG. 1(a), which is connected with a voltage application circuit.

When the resultant electrophoretic display device is subjected to contrast display (FIG. 3) for a long time by driving it at a drive voltage of ±10 V, the electrophoretic particles are excellent in dispersibility, chargeability and (color) definition, and it is possible to effect clear white/black display.

Example 1-10

A plurality of microcapsules 1i each containing an electrophoretic dispersion liquid prepared in the same manner as in Example 1-9 are prepared by in-situ polymerization method. Each microcapsule is formed of melamine-formaldehyde resin as a film-forming material. An electrophoretic display device, as shown in FIG. 1(b), which is connected with a voltage application circuit is prepared by disposing the plurality of microcapsules 1i on a first substrate 1a by use of nozzles according to the ink jet method.

When the resultant electrophoretic display device is subjected to contrast display (FIG. 3) for a long time by driving it at a drive voltage of ±10 V, the electrophoretic particles are excellent in dispersibility, chargeability and (color) definition, and it is possible to effect clear white/black display.

Hereinbelow, Second invention will be described more specifically based on Examples but is not limited thereto.

Example 2-1

In toluene, titanium oxide particles (average particle size: 200 nm, having hydroxy group at particle surface) and Precursor 1 (n=10) of nitroxide-mediated polymerization initiation group are reacted with each other to introduce nitroxide-mediated polymerization initiation group at the particle surface of titanium oxide particles. After the titanium oxide particles are dispersed in toluene, in the resultant system, dodecyl acrylate is added. The reaction system is aerated with nitrogen and subjected to nitroxide-mediated polymerization at 90° C. for a predetermined time. In this case, nitroxide similar to Precursor 1 of the nitroxide-mediated polymerization initiation group as a free polymerization initiation group (radical) is added in the reaction system in advance so as to provide an index of molecular weight and molecular weight distribution of a polymer chain grafted to the particle surface of titanium oxide particles.

After the polymerization, the resultant polymer particles are washed, followed by purification and drying to obtain objective electrophoretic particles.

The electrophoretic particles are well dispersed in chloroform, so that it is possible to confirm that dodecyl polyacrylate is grafted at the particle surface of titanium oxide. Further, when a polymer obtained from Nitroxide 1 added as the free polymerization initiation group is subjected to measurement of molecular weight and molecular weight distribution, the polymer has a number-average molecular weight of about 50,000 and a molecular weight dispersion index (weight-average molecular weight/number-average molecular weight) of 1.20. As a result, it is possible to confirm that the polymer chains grafted to the core particles have a uniform chain length.

An electrophoretic dispersion liquid is prepared by using 5 wt. % of the electrophoretic particles (white particles), 0.1 wt. % of a colorant ("Oil Blue N", mfd. by Aldrich Co.), 2.5 wt. % of rosin acid (acidic additive), and 92.9 wt. % of an electrophoretic dispersion medium ("Isoper H, mfd. by Exxon Corp.). The electrophoretic particles are positively charged by acid-base interaction between the grafted dodecyl polyacrylate and rosin acid. Further, the grafted dodecyl polyacrylate has an expanse in the electrophoretic dispersion medium, thus having also a dispersion function.

The electrophoretic dispersion liquid is injected into a cell by using nozzles according to an ink jet method to provide an electrophoretic display device, as shown in FIG. 1(a), which is connected with a voltage application circuit.

When the resultant electrophoretic display device is subjected to contrast display for a long time by driving it at a drive voltage of ±10 V, the electrophoretic particles are excellent in dispersibility, chargeability and (color) definition, and it is possible to effect clear blue/white display.

Example 2-2

A plurality of microcapsules 1i each containing an electrophoretic dispersion liquid prepared in the same manner as in Example 2-1 are prepared by in-situ polymerization method. Each microcapsule is formed of urea-formaldehyde resin as a film-forming material. An electrophoretic display device, as shown in FIG. 1(b), which is connected with a voltage application circuit is prepared by disposing the plurality of microcapsules 1i on a first substrate 1a by use of nozzles according to the ink jet method.

When the resultant electrophoretic display device is subjected to contrast display for a long time by driving it at a drive voltage of ±10 V, the electrophoretic particles are excellent in dispersibility, chargeability, and (color) definition and it is possible to effect clear blue/white display.

Example 2-3

In toluene, magnetite particles (average particle size: 200 nm, having hydroxy group at particle surface) and Precursor 14 (n=6) of atom transfer radical polymerization initiation group are reacted with each other to introduce atom transfer radical polymerization initiation group at the particle surface of magnetite particles. After the magnetite particles are dispersed in toluene, in the resultant system, octadecyl methacrylate is added. The reaction system is aerated with nitrogen and subjected to atom transfer radical polymerization at 70° C. for a predetermined time. In this case, 2-bromo ethyl isobutylene as a free polymerization initiation group (radical) is added in the reaction system in advance so as to provide an index of molecular weight and molecular weight distribution of a polymer chain grafted to the particle surface of magnetite particles.

After the polymerization, the resultant polymer particles are washed, followed by purification and drying to obtain objective electrophoretic particles 4e.

The electrophoretic particles 4e are well dispersed in chloroform, so that it is possible to confirm that octadecyl polyacrylate is grafted at the particle surface of magnetite. Further, when a polymer obtained from 2-bromo ethyl isobutylate added as the free polymerization initiation group is subjected to measurement of molecular weight and molecular weight distribution, the polymer has a number-average molecular weight of about 110,000 and a molecular weight dispersion index (weight-average molecular weight/number-average molecular weight) of 1.07. As a result, it is possible to confirm that the polymer chains grafted to the magnetite particles have a uniform chain length.

An electrophoretic dispersion liquid is prepared by using 1 wt. % of the electrophoretic particles 4e (black particles), 0.5 wt. % of rosin acid (acidic additive), and 98.5 wt. % of an electrophoretic dispersion medium 4f ("Isoper H, mfd. by Exxon Corp.). The electrophoretic particles 4e are positively charged by acid-base interaction between the grafted octadecyl polyacrylate and rosin acid. Further, the grafted octadecyl polyacrylate has an expanse in the electrophoretic dispersion medium 4f, thus having also a dispersion function.

The electrophoretic dispersion liquid is injected into a cell by using nozzles according to an ink jet method to provide an electrophoretic display device, as shown in FIG. 4(a), which is connected with a voltage application circuit.

When the resultant electrophoretic display device is subjected to contrast display for a long time by driving it at a drive voltage of ±10 V, the electrophoretic particles 4e are excellent in dispersibility, chargeability and (color) definition, and it is possible to effect clear white/black display.

Example 2-4

A plurality of microcapsules 4j each containing an electrophoretic dispersion liquid prepared in the same manner as in Example 2-3 are prepared by interfacial polymerization method. Each microcapsule is formed of polyamide resin as a film-forming material. An electrophoretic display device, as shown in FIG. 4(b), which is connected with a voltage application circuit is prepared by disposing the plurality of microcapsules 4j on a first substrate 4a by use of nozzles according to the ink jet method.

When the resultant electrophoretic display device is subjected to contrast display for a long time by driving it at a drive voltage of ±10 V, the electrophoretic particles 4e are excellent in dispersibility, and chargeability, and it is possible to effect clear white/black display.

Example 2-5

In toluene, magnetite particles (average particle size: 200 nm, having hydroxy group at particle surface) and Precursor 5 (n=10) of nitroxide-mediated polymerization initiation group are reacted with each other to introduce nitroxide-mediated polymerization initiation group at the particle surface of magnetite particles. After the magnetite particles are dispersed in dimethylformamide, in the resultant system, acrylic acid is added. The reaction system is aerated with nitrogen and subjected to nitroxide-mediated polymerization at 100° C. for a predetermined time. After acrylic acid is consumed, isoprene is added to the reaction system in a molar ratio of (acrylic acid):(isoprene)=1:9 to form a graft polymer chain of block copolymer. In this case, nitroxide similar to Precursor 5 of the nitroxide-mediated polymerization initiation group, as a free polymerization initiation group (radical) is added in the reaction system in advance so as to provide an index of molecular weight and molecular weight distribution of a polymer chain grafted to the particle surface of magnetite particles.

After the polymerization, the resultant polymer particles are washed, followed by purification and drying to obtain objective electrophoretic particles 4e.

The electrophoretic particles 4e are well dispersed in chloroform, so that it is possible to confirm that block copolymer of polyacrylic acid and polyisoprene is grafted at the particle surface of magnetite. Further, when a polymer obtained from the nitroxide added as the free polymerization initiation group is subjected to measurement of molecular weight and molecular weight distribution, the polymer has a number-average molecular weight of about 70,000 and a molecular weight dispersion index (weight-average molecular weight/number-average molecular weight) of 1.28. As a result, it is possible to confirm that the polymer chains grafted to the magnetite particles are the block copolymer having a uniform chain length.

An electrophoretic dispersion liquid is prepared by using 1 wt. % of the electrophoretic particles 4e (black particles), 0.5 wt. % of polyisobutylenesuccinimide (basic additive), and 98.5 wt. % of an electrophoretic dispersion medium 4f ("Isoper H, mfd. by Exxon Corp.). The electrophoretic particles 4e are positively charged by acid-base interaction between the grafted polyacrylic acid site of the block copolymer and polyisobutylenesuccinimide. Further, the grafted polyisoprene site of the block copolymer has an expanse in the electrophoretic dispersion medium 4f, thus having a dispersion function.

The electrophoretic dispersion liquid is injected into a cell by using nozzles according to an ink jet method to provide an electrophoretic display device, as shown in FIG. 4(a), which is connected with a voltage application circuit.

When the resultant electrophoretic display device is subjected to contrast display for a long time by driving it at a drive voltage of ±10 V, the electrophoretic particles 4e are excellent in dispersibility, chargeability and (color) definition, and it is possible to effect clear white/black display.

Example 2-6

A plurality of microcapsules 4j each containing an electrophoretic dispersion liquid prepared in the same manner as in Example 2-5 are prepared by interfacial polymerization method. Each microcapsule is formed of polyamide resin as a film-forming material. An electrophoretic display device, as shown in FIG. 4(b), which is connected with a voltage application circuit is prepared by disposing the plurality of microcapsules 4j on a first substrate 4a by use of nozzles according to the ink jet method.

When the resultant electrophoretic display device is subjected to contrast display for a long time by driving it at a drive voltage of ±10 V, the electrophoretic particles 4e are excellent in dispersibility, chargeability and (color) definition, and it is possible to effect clear white/black display.

Example 1-7

In toluene, magnetite particles (average particle size: 100 nm, having hydroxy group at particle surface) and Precursor 17 of atom transfer radical polymerization initiation group are reacted with each other to introduce atom transfer radical polymerization initiation group at the particle surface of magnetite particles. After the magnetite particles are dispersed in dimethylformamide, in the resultant system, aminoethyl acrylate is added.

The reaction system is aerated with nitrogen and subjected to atom transfer radical polymerization at 80° C. for a predetermined time. After aminoethyl acrylate is consumed, 1-hexene is added to the reaction system in a molar ratio of (aminoethyl acrylate):(1-hexene)=1:9 to form a graft polymer chain of block copolymer. In this case, benzyl chloride as a free polymerization initiation group (radical) is added in the reaction system in advance so as to provide an index of molecular weight and molecular weight distribution of a polymer chain grafted to the particle surface of magnetite particles.

After the polymerization, the resultant polymer particles are washed, followed by purification and drying to obtain objective electrophoretic particles 4e.

The electrophoretic particles 4e are well dispersed in chloroform, so that it is possible to confirm that block copolymer of polyacrylic acid and polyisoprene is grafted at the particle surface of magnetite. Further, when a polymer obtained from benzyl chloride added as the free polymerization initiation group is subjected to measurement of molecular weight and molecular weight distribution, the polymer has a number-average molecular weight of about 70,000 and a molecular weight dispersion index (weight-average molecular weight/number-average molecular weight) of 1.18. As a result, it is possible to confirm that the polymer chains grafted to the magnetite particles are the block copolymer having a uniform chain length.

An electrophoretic dispersion liquid is prepared by using 1 wt. % of the electrophoretic particles 4e (black particles), 0.5 wt. % of rosin acid (acidic additive), and 98.5 wt. % of an electrophoretic dispersion medium 4f ("Isoper H, mfd. by Exxon Corp.). The electrophoretic particles 4e are positively charged by acid-base interaction between the grafted polyaminoethyl acrylate site of the block copolymer and polyisobutylenesuccinimide. Further, the grafted polyhexene site of the block copolymer has an expanse in the electrophoretic dispersion medium 4f, thus having a dispersion function.

The electrophoretic dispersion liquid is injected into a cell by using nozzles according to an ink jet method to provide an electrophoretic display device, as shown in FIG. 4(a), which is connected with a voltage application circuit.

When the resultant electrophoretic display device is subjected to contrast display for a long time by driving it at a drive voltage of ±10 V, the electrophoretic particles 4e are excellent in dispersibility, chargeability and (color) definition, and it is possible to effect clear white/black display.

Example 2-8

A plurality of microcapsules 4j each containing an electrophoretic dispersion liquid prepared in the same manner as in Example 2-7 are prepared by in-situ polymerization method. Each microcapsule is formed of melamine-formaldehyde resin as a film-forming material. An electrophoretic display device, as shown in FIG. 4(b), which is connected with a voltage application circuit is prepared by disposing the plurality of microcapsules 4j on a first substrate 4a by use of nozzles according to the ink jet method.

When the resultant electrophoretic display device is subjected to contrast display for a long time by driving it at a drive voltage of ±10 V, the electrophoretic particles 4e are excellent in dispersibility, chargeability and (color) definition, and it is possible to effect clear white/black display.

Example 2-9

An electrophoretic dispersion liquid is prepared by using 5 wt. % of electrophoretic particles (white particles) obtained in the same manner as in Example 2-1, 2.5 wt. % of rosin acid (acidic additive), 3 wt. % of electrophoretic particles (black particles) obtained in the same manner as in Example 2-5, 1.5 wt. % of polyisobutylenesuccinimide (basic additive), and 88 wt. % of an EDM (Isoper H). In the electrophoretic dispersion liquid, the white electrophoretic particles are positively charged and the black electrophoretic particles are negatively charged.

The electrophoretic dispersion liquid is injected into a cell by using nozzles according to an ink jet method to provide an electrophoretic display device, as shown in FIG. 1(a), which is connected with a voltage application circuit.

When the resultant electrophoretic display device is subjected to contrast display (FIG. 3) for a long time by driving it at a drive voltage of ±10 V, the electrophoretic particles are excellent in dispersibility, chargeability and (color) definition, and it is possible to effect clear white/black display.

Example 2-10

A plurality of microcapsules 1i each containing an electrophoretic dispersion liquid prepared in the same manner as in Example 2-9 are prepared by in-situ polymerization method. Each microcapsule is formed of melamine-formaldehyde resin as a film-forming material. An electrophoretic display device, as shown in FIG. 1(b), which is connected with a voltage application circuit is prepared by disposing the plurality of microcapsules 1i on a first substrate 1a by use of nozzles according to the ink jet method.

When the resultant electrophoretic display device is subjected to contrast display (FIG. 3) for a long time by driving it at a drive voltage of ±10 V, the electrophoretic particles are excellent in dispersibility, chargeability and (color) definition, and it is possible, to effect clear white/black display.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application Nos. 161697/2004 filed May 31, 2004, and 171349/2004 filed Jun. 9, 2004, which are hereby incorporated by reference.

What is claimed is:

1. An electrophoretic display device, comprising:
   electrophoretic particles comprising pigment particles and a polymer chain, wherein said pigment particles are made of titanium oxide or magnetite,
   wherein said polymer chain comprises a silyl group bound to a surface of the pigment particles via an oxygen atom, and said polymer chain is constituted from a basic monomer, an acidic monomer or a fluorine-containing monomer, and
   wherein said monomers are living-polymerizable by an initialization group including nitroxide or an atom transfer radical;
   a dispersion medium for dispersing the electrophoretic particles; and
   a cell in which the electrophoretic particles and the dispersion medium are filled.

2. A device according to claim 1, wherein said cell is provided in a plurality of cell portions.

* * * * *